US012070730B1

(12) United States Patent
Grill

(10) Patent No.: US 12,070,730 B1
(45) Date of Patent: Aug. 27, 2024

(54) GAS MIXING AND PRODUCT PRODUCTION SYSTEMS AND METHODS

(71) Applicant: Stearns, Conrad and Schmidt, Consulting Engineers, Inc., Reston, VA (US)

(72) Inventor: Jeffrey Grill, Cypress, CA (US)

(73) Assignee: Stearns, Conrad and Schmidt, Consulting Engineers, Inc., Reston, VA (US)

(*) Notice: Subject to any disclaimer, the term of this patent is extended or adjusted under 35 U.S.C. 154(b) by 0 days.

(21) Appl. No.: 18/174,026

(22) Filed: Feb. 24, 2023

(51) Int. Cl.

| | |
|---|---|
| ***B01F 35/00*** | (2022.01) |
| ***B01F 23/10*** | (2022.01) |
| ***B01F 35/221*** | (2022.01) |
| ***B01F 35/71*** | (2022.01) |

(52) U.S. Cl.
CPC .......... *B01F 35/714* (2022.01); *B01F 23/191* (2022.01); *B01F 35/2211* (2022.01); *B01F 35/718051* (2022.01)

(58) Field of Classification Search
CPC ............ B01F 23/191; B01F 35/718051; B01F 35/714; B01F 35/2211
See application file for complete search history.

(56) References Cited

U.S. PATENT DOCUMENTS

2016/0310918 A1* 10/2016 Baldus ................ G06F 11/0745

* cited by examiner

*Primary Examiner* — Anshu Bhatia
(74) *Attorney, Agent, or Firm* — Maier & Maier, PLLC

(57) ABSTRACT

A method of for mixing gases is described. The gases may include a first and a second gas wherein a gas mixing system accepts the gases and operates in a plurality of modes of operation to produce a discharge gas including a mixture thereof, and the second gas may be supplied without the first gas, and the first gas may be supplied without the second gas. The gas mixing system may be integrated with a gas processing system to produce a biogas-related product. The gas mixing system may be a compressor, a jet compressor, an ejector, an eductor, venturi jet pump, eductor-jet pump, and/or a thermocompressor, that uses a first stream of high-pressure gas to entrain a relatively lower pressure second gas, mixes the two, and discharges a third gas mixture that is of a sufficiently elevated pressure to be supplied to other areas of a production facility.

20 Claims, 18 Drawing Sheets

GAS PURIFICATION SYSTEM

GAS PURIFICATION SYSTEM

GAS MIXING SYSTEM

GAS MIXING SYSTEM

GAS MIXING SYSTEM

GAS MIXING SYSTEM

STATE 1: FIRST GAS PASSES THROUGH GAS MIXING SYSTEM

GAS MIXING SYSTEM

STATE 2: FIRST GAS DOES NOT PASS THROUGH GAS MIXING SYSTEM

GAS MIXING AND PRODUCT PRODUCTION SYSTEMS AND METHODS

TECHNICAL FIELD

The present disclosure relates to improvements to processing and mixing of gases and production of products.

BACKGROUND

Biogas is produced by the biological breakdown of organic matter. Biogas can be produced from a variety of sources of organic matter and may be produced in and collected from and not only including bioreactors, anerobic digesters, waste water treatment facilities, or landfills.

A multitude of biogas-derived products can be produced from biogas. There exists a need to produce biogas-related products in a manner that permits the mixing and recycling of gases with varying pressures and flows from a variety of unit operations throughout a gas purification system, to maximize plant up-time, minimize facility emissions, increase equipment efficiency, and reduce capital intensity, maintenance, and complexity.

There exists a need to produce biogas from a landfill by pulling a constant vacuum on the landfill to prevent disruptions in flows from the landfill collection points to continuously transfer the biogas to the purification and production facility on a continuous basis while dampening pressure and fluctuations caused by processing operations in the facility. A problem currently exists in recycling relatively lower pressure gases to locations having a relatively higher pressure within a biogas purification facility. These operations require the addition of costly compression equipment and infrastructure.

To compound the problem, to transfer lower pressure gases to higher pressure environments in the plant, some unit operations within the facility operate on a cyclic batch, or batch modes, and therefore their recycle and supply to a different location within the production plant causes problems of pressure fluctuations at the landfill itself, causing non-uniform vacuum at landfill biogas collection points, and inconsistent flow in the biogas due to variations in vacuum at each point of collection. As a result, the landfill wellfield may experience difficulties in maintaining an effective wellfield vacuum and undesired surface emissions may result.

A need exists to reliably produce a biogas-related product that has undergone a purification process to maintain consistent and safe operations of the gas processing facility, while protecting assets to avoid and reduce additional or unexpected costs, to produce a safe and on-specification biogas-related product to the consumer.

There exists a need for improvements to gas production facilities that employ a gas mixing system to mix and recycle gases at varying pressures and inconsistent flows to consistently and reliably product a biogas-related product.

There exists a need to commercially deploy a gas mixing system in the biogas industry that is simple in construction, has relatively low cost, few to no moving parts, that is quiet, easy to install, simple, with few to no electrical components, that is economical to operate, and readily adaptable to handing gases of varying compositions and contaminants including corrosive properties.

There is a need to implement a gas mixing system in biogas production related applications that employs the use of a compressor, a jet compressor, an ejector, an eductor, venturi jet pump, eductor-jet pump, and/or a thermocompressor, that uses a first stream of high-pressure gas to entrain a relatively lower pressure second gas, mixes the two, and discharges a discharge gas mixture that is of a sufficiently elevated pressure to be safely recycled and supplied to another area of the gas production facility.

There is a need to implement a gas mixing system in biogas production related applications that employs the use of a compressor, a jet compressor, an ejector, an eductor, venturi jet pump, eductor-jet pump, and/or a thermocompressor, that does not require a first stream of high-pressure gas to entrain a second gas that is at a sufficiently elevated pressure to be safely recycled and supplied to another area of the gas production facility.

There is a need to implement a gas mixing system in gas production related applications that employs the use of a compressor, a jet compressor, an ejector, an eductor, venturi jet pump, eductor-jet pump, and/or a thermocompressor, that only uses a first stream of high-pressure gas to be safely recycled and supplied to another area of the gas production facility.

A need exists for a recycled gas to be maintained at either a constant and predetermined discharge pressure or a constant and predetermined discharge flow rate.

SUMMARY

This Summary is provided merely to introduce certain concepts and not to identify any key or essential features of the claimed subject matter.

In embodiments, a method for mixing gases comprises:

- providing a gas mixing system, said gas mixing system comprising: a first gas inlet configured to accept a first gas having a first pressure and a first flow rate; a second gas inlet configured to accept a second gas having a second pressure and a second flow rate; and a discharge gas outlet configured to evacuate a discharge gas from said gas mixing system; and
- operating said gas mixing system in a plurality of modes of operation to produce said discharge gas, comprising:
- in a first mode of operation, wherein said first flow rate of said first gas is greater than said second flow rate of said second gas, and wherein said first pressure of said first gas is greater than said second pressure of said second gas, said first gas entraining said second gas in said mixing system to mix said first gas with said second gas to produce said discharge gas comprising a mixture of said first gas and said second gas; and
- in a second mode of operation, wherein said second flow rate of said second gas is greater than said first flow rate of said first gas, and said first flow rate of said first gas in said second mode of operation is lesser than said first flow rate of said first gas in said first mode of operation; and said second pressure of said second gas is greater in said second mode of operation relative to said second pressure of said second gas in said first mode of operation.

In embodiments of the method for mixing gases, in said second mode of operation, said flow rate of said first gas comprises no flow.

In embodiments of the method for mixing gases, in said second mode of operation, said discharge gas comprises a greater proportion of said second gas relative to said first mode of operation.

In embodiments of the method for mixing gases, in said second mode of operation, said discharge gas comprises a pressure lesser than or equal to said second pressure of said second gas in said second mode of operation.

In embodiments of the method for mixing gases, in said first mode of operation, said first gas entrains said second gas by using a momentum of said first gas.

In embodiments of the method for mixing gases, in said first mode of operation, after said first gas is supplied to said first gas inlet of said gas mixing system, said gas mixing system creates a high-velocity jet of said first gas as said first gas passes through said gas mixing system, and said momentum of said high-velocity jet of said first gas entrains said second gas within said first gas within said gas mixing system to produce said discharge gas comprising said mixture of said first gas and said second gas.

In embodiments of the method for mixing gases, said gas mixing system comprises one or more gas mixing systems selected from the group consisting of a compressor, a jet compressor, an ejector, an eductor, venturi jet pump, eductor-jet pump, and a thermocompressor.

In embodiments, the method for mixing gases comprises one or more selected from the group consisting of:

- said first gas is derived from a source of biogas;
- said second gas is derived from said source of biogas;
- said discharge gas is used to produce at least a portion of said first gas;
- said discharge gas is used to produce at least a portion of said second gas; and
- said discharge gas is used to produce a biogas-related product, said biogas-related product includes one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, diesel, and power.

In embodiments of the method for mixing gases, in said first mode of operation, said discharge gas comprises a third pressure greater than said second pressure of said second gas and lesser than said first pressure of said first gas.

In embodiments of the method for mixing gases, said second gas is supplied by a batch process, and said first gas is supplied by a continuous process.

In embodiments of the method for mixing gases, said second gas comprises a greater amplitude of pressure variations relative to said first gas.

In embodiments of the method for mixing gases, said second gas is supplied from a vessel including a material undergoing a desorption step, and in said first mode of operation, said first gas entraining said second gas assists in said desorption of said material in said desorption step.

In embodiments of the method for mixing gases, said second gas is supplied from a vessel, and in said first mode of operation, said first gas entraining said second gas assists in evacuating said second gas from said vessel to a predetermined pressure within said vessel.

In embodiments, the method for mixing gases further comprises:

- providing a first control valve to regulate said flow rate of said first gas supplied to said first gas inlet of said gas mixing system; and
- providing a second control valve to regulate said flow rate of said second gas supplied to said second gas inlet of said gas mixing system;
- in said first mode of operation, said first control valve and said second control valve are both open; and
- in said second mode of operation, said first control valve is closed.

In embodiments, the method for mixing gases further comprises:

- providing a first control valve to regulate said flow rate of said first gas supplied to said first gas inlet of said gas mixing system; and
- providing a second control valve to regulate said flow rate of said second gas supplied to said second gas inlet of said gas mixing system;
- in said first mode of operation, said first control valve and said second control valve are both open; and
- in said second mode of operation, said first control valve is open a lesser amount relative to said first mode of operation.

In embodiments, the method for mixing gases further comprises:

- providing a first control valve to regulate said flow rate of said first gas supplied to said first gas inlet of said gas mixing system;
- providing a second control valve to regulate said flow rate of said second gas supplied to said second gas inlet of said gas mixing system; and
- in said first mode of operation and in said second mode of operation, modulating said first control valve and/or said second control valve to maintain a predetermined third flow of said discharge gas.

In embodiments, the method for mixing gases further comprises:

in said first mode of operation and in said second mode of operation, a predetermined third flow of said discharge gas is identical.

In embodiments, the method for mixing gases further comprises:

in said first mode of operation and in said second mode of operation, said predetermined third flow of said discharge gas are not identical.

In embodiments, the method for mixing gases further comprises:

- providing a first control valve to regulate said flow rate of said first gas supplied to said first gas inlet of said gas mixing system; and
- providing a second control valve to regulate said flow rate of said second gas supplied to said second gas inlet of said gas mixing system;
- in said first mode of operation, said first control valve and said second control valve are both modulated to maintain a predetermined third flow of said discharge gas; and in said second mode of operation, said second control valve is modulated to maintain a predetermined third flow of said discharge gas.

In embodiments, the method for mixing gases further comprises:

- providing a first control valve to regulate said flow rate of said first gas supplied to said first gas inlet of said gas mixing system;
- providing a second control valve to regulate said flow rate of said second gas supplied to said second gas inlet of said gas mixing system;
- setting said first control valve to open; and
- setting said second control valve to closed.

In embodiments, a method to produce a gas-related product comprises:

- providing a gas processing system, said gas processing system configured to accept a source of gas; and said gas processing system is configured to process said source of gas to produce a first gas, a second gas, and a product; and
- providing said gas mixing system, said gas mixing system comprising a first gas inlet configured to accept a first gas having a first pressure and a first flow rate; a second gas inlet configured to accept a second gas having a second pressure and a second flow rate; and a discharge gas outlet configured to evacuate a discharge gas from said gas mixing system, wherein said gas mixing system is configured to accept said first gas and said second gas from said gas processing system to produce said discharge gas, wherein said discharge gas is supplied to said gas processing system to produce at least a portion of said first gas, said second gas, and said product; and supplying said source of gas to said gas processing system;

processing said source of gas within said gas processing system to produce said first gas, said second gas, and said product;

supplying said first gas and said second gas from said gas processing system to said gas mixing system to produce said discharge gas; and supplying said discharge gas to said gas processing system to produce at least a portion of said first gas, said second gas, and said product.

In embodiments of the method to produce a gas-related product, said gas processing system comprises one or more processing systems selected from the group consisting of a water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, a combustion process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms; said first gas and said second gas are evacuated from said gas processing system before or after one or more of said processing systems; and said discharge gas is supplied to said gas processing system before or after one or more of said processing systems.

In embodiments of the method to produce a gas-related product, said gas processing system comprises a pressurization process;

said first gas and said second gas are evacuated from the gas processing system before and after said pressurization process; and said discharge gas is supplied to said gas processing system before said pressurization process.

In embodiments of the method to produce a gas-related product, said gas processing system comprises a pressurization process;

said first gas and said second gas are evacuated from the gas processing system after said pressurization process; and said discharge gas is supplied to said gas processing system before said pressurization process.

In embodiments, a gas purification system comprises:

a gas processing system comprising an inlet configured to accept a source of gas, said gas processing system includes: one or more process systems configured to process said source of gas to produce a first gas, a second gas, and a product; a product outlet configured to release the product; and a discharge gas inlet configured to accept a discharge gas; and a gas mixing system comprising a first gas inlet configured to accept said first gas, a second gas inlet configured to accept said second gas, and a discharge gas outlet configured to evacuate said discharge gas from said gas mixing system, said gas mixing system being configured to mix said first gas and said second gas to produce said discharge gas, wherein said discharge gas outlet is configured to release at least a portion of said discharge gas into the discharge gas inlet of said gas processing system.

In embodiments of the gas purification system:

said at least one gas processing system further comprises a first gas outlet and a second gas outlet, and said first gas inlet of the gas mixing system is configured to accept said first gas from said first gas outlet, and said second gas inlet of the gas mixing system is configured to accept said second gas from said second gas outlet.

In embodiments of the gas purification system, it comprises at least two gas processing systems:

wherein a first gas processing system comprises an inlet configured to accept said source of gas that includes and/or is derived from a source of biogas, said first gas processing system includes: one or more process systems configured to process said source of gas to produce a first gas, a second gas, and a first product; a first product outlet configured to release the first product; and a discharge gas inlet configured to accept said discharge gas;

wherein a second gas processing system comprises an inlet configured to accept a source of gas that includes and/or is derived from a source of biogas, said second gas processing system includes: one or more process systems configured to process said source of gas to produce a first gas, a second gas, and a second product; and a second product outlet configured to release the second product;

wherein the first product outlet of said first gas processing system is configured to provide the first product to the inlet of the second gas processing system as said source of gas.

In embodiments of the gas purification system having at least two gas processing systems:

at least one of said first gas processing system and said second gas processing system further comprises a first gas outlet; and said first gas inlet of the gas mixing system is configured to accept said first gas from said first gas outlet, and said second gas inlet of the gas mixing system is configured to accept said second gas from said second gas outlet.

In embodiments of the gas purification system having at least two gas processing systems:

at least one of said first gas processing system and said second gas processing system further comprises a second gas outlet; and said second gas inlet of the gas mixing system is configured to accept said second gas from said second gas outlet.

In embodiments of the gas purification system having at least two gas processing systems: said first gas processing system comprises a first gas outlet;

said second gas processing system comprises a second gas outlet;

said second gas inlet of the gas mixing system is configured to accept said second gas from said second gas outlet;

said first gas inlet of the gas mixing system is configured to accept said first gas from said first gas outlet; and said second gas inlet of the gas mixing system is configured to accept said second gas from said second gas outlet.

In embodiments of the gas purification system:

said gas mixing system comprises one or more gas mixing systems selected from the group consisting of a compressor, a jet compressor, an ejector, an eductor, venturi jet pump, eductor-jet pump, and a thermocompressor.

In embodiments of the gas purification system:

said gas mixing system is configured to operate in a plurality of modes of operation: said gas mixing system comprising:

said first gas inlet is configured to accept said first gas, said first gas comprises a first pressure and a first flow rate;

said second gas inlet is configured to accept said second gas, said second gas comprises a second pressure and a second flow rate; and said discharge gas outlet is configured to evacuate said discharge gas from said gas mixing system;

wherein said gas mixing system is configured to operate in said plurality of modes of operation, comprising:

in a first mode of operation, said first flow rate of said first gas is greater than said second flow rate of said second gas, and said first pressure of said first gas is greater than said second pressure of said second gas, wherein said first gas entrains said second gas in said gas mixing system to mix said first gas with said second gas to produce said discharge gas comprising a mixture of said first gas and said second gas; and in a second mode of operation, said second flow rate of said second gas is greater than said first flow rate of said first gas, and said first flow rate of said first gas in said second mode of operation is lesser than said first flow rate of said first gas in said first mode of operation; and said second pressure of said second gas is greater in said second mode of operation relative to said second pressure of said second gas in said first mode of operation.

BRIEF DESCRIPTION OF THE DRAWINGS

The accompanying figures show schematic process flowcharts of preferred embodiments and variations thereof. A full and enabling disclosure of the content of the accompanying claims, including the best mode thereof to one of ordinary skill in the art, is set forth more particularly in the remainder of the specification, including reference to the accompanying figures showing how the preferred embodiments and other non-limiting variations of other embodiments described herein may be carried out in practice, in which:

FIG. 18 shows a first state of operation wherein the first gas (FG) passes through the gas mixing system (3).

FIG. 19 shows a second state of operation wherein the first gas (FG) does not pass through the gas mixing system (3).

DETAILED DESCRIPTION

Reference will now be made in detail to various embodiments of the disclosure. Each embodiment is provided by way of explanation of the disclosure, not limitation of the disclosure. In fact, it will be apparent to those skilled in the art that modifications and variations can be made in the disclosure without departing from the teaching and scope thereof. For instance, features illustrated or described as part of one embodiment to yield a still further embodiment derived from the teaching of the disclosure. Thus, it is intended that the disclosure or content of the claims cover such derivative modifications and variations to come within the scope of the disclosure or claimed embodiments described herein and their equivalents.

Additional objects and advantages of the disclosure will be set forth in part in the description which follows, and in part will be obvious from the description, or may be learned by practice of the claims. The objects and advantages of the disclosure will be attained by means of the instrumentalities and combinations and variations particularly pointed out in the appended claims.

FIG. 1

Figure 1:
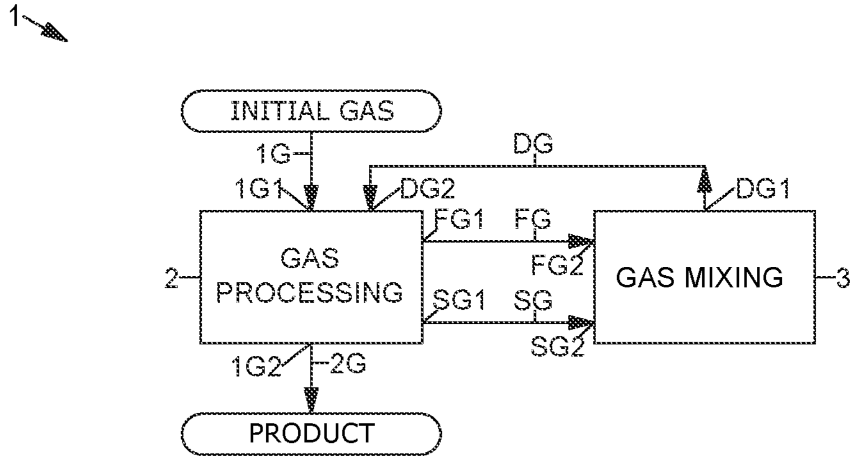
FIG. 1 depicts a non-limiting embodiment of a gas purification system (1) including a gas processing system (2) that supplies both a first gas (FG) and a second gas (SG) to a gas mixing system (3), where the first and second gases (FG, SG) are mixed therein to produce a discharge gas (DG), that is then supplied back to the gas processing system (2).

FIG. 1 depicts a non-limiting embodiment of a gas purification system (1) including a gas processing system (2) that supplies both a first gas (FG) and a second gas (SG) to a gas mixing system (3), where the first and second gases (FG, SG) are mixed therein to produce a discharge gas (DG), that is then supplied to the gas processing system (2).

FIG. 1 shows an initial gas (1G) supplied to an initial gas inlet (1G1) of the gas processing system (2). In embodiments, the initial gas (1G) comprises a biogas, and/or is derived from a biogas. In embodiments, the initial gas (1G) does not comprise a biogas and/or is not derived from a biogas. In embodiments, the initial gas (1G) comprises a source of biogas, and/or is derived from a source of biogas, and includes one or more selected from the group consisting of: said source of biogas is produced in and collected from a bioreactor; said source of biogas is produced in and collected from an anerobic digester; said source of biogas is produced in and collected from a landfill; and said source of biogas is produced in and collected from a waste water treatment facility.

In embodiments, the biogas comprises at least methane. In embodiments, the biogas comprises methane, water vapor, hydrogen sulfide, volatile organic compounds, halogenated volatile organic compounds, carbon dioxide, nitrogen, oxygen, siloxanes, and metals. In embodiments, the biogas comprises two or three or more compounds selected from the group consisting of methane, water vapor, hydrogen sulfide, volatile organic compounds, halogenated volatile organic compounds, carbon dioxide, nitrogen, oxygen, siloxanes, and metals.

In embodiments, FIG. 1 shows an initial gas (1G) supplied to the gas processing system (2) and undergoes gas processing to purify methane within the gas processing system (2) by using a series of gas processing steps configured to sequentially remove and/or separate one or two or three or more or all compounds selected from the group consisting of water vapor, hydrogen sulfide, volatile organic compounds, halogenated volatile organic compounds, carbon dioxide, nitrogen, oxygen, siloxanes, and metals. In embodiments, metal contaminants within the biogas not only include one or more metals selected from the group consisting of arsenic, cadmium, chromium, lead, and mercury. In embodiments, the initial gas (1G) is derived from biogas. In embodiments, the initial gas (1G) is derived from biogas including a renewable natural gas comprising at least methane.

In embodiments, FIG. 1 shows an initial gas (1G) supplied to the gas processing system (2) and undergoes gas processing to purify the initial gas (1G) within the gas processing system (2) by using a series of gas processing steps configured to sequentially remove and/or separate one or two or three or more or all compounds selected from the group consisting of water vapor, hydrogen sulfide, volatile organic compounds, halogenated volatile organic compounds, carbon dioxide, nitrogen, oxygen, siloxanes, and metals. In embodiments, metal contaminants within the biogas not only include one or more metals selected from the group consisting of arsenic, cadmium, chromium, lead, and mercury. In embodiments, the initial gas (1G) is not derived from biogas.

The gas processing system (2) accepts the initial gas (1G) and processes the initial gas (1G) to produce a product (2G), wherein said product comprises one or more products selected from the group consisting of a processed gas, renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, diesel, and power.

In embodiments, the product (2G) comprises a processed gas, wherein the processed gas includes a gas that has been processed to separate a constituent from said initial gas (1G), within the gas processing system (2), wherein said constituent that has been separated from the initial gas (1G) includes one or more constituents selected from the group consisting of methane, water vapor, hydrogen sulfide, volatile organic compounds, halogenated volatile organic compounds, carbon dioxide, nitrogen, oxygen, siloxanes, and metals.

In embodiments, the product (2G) comprises a processed gas, wherein the processed gas includes a gas that has been processed to separate a constituent from said initial gas (1G), within the gas processing system (2), wherein said constituent that has been separated from the initial gas (1G) includes two or three or more constituents selected from the group consisting of methane, water vapor, hydrogen sulfide, volatile organic compounds, halogenated volatile organic compounds, carbon dioxide, nitrogen, oxygen, siloxanes, and metals.

In embodiments, the gas processing system (2) comprises one or more processing systems selected from the group consisting of a water separation process, a hydrogen sulfide separation process, volatile organic compound separation process, a carbon dioxide separation process, a nitrogen separation process, and an oxygen removal process. In embodiments, the gas processing system (2) comprises a pressurization step before or after any one of the processing systems mentioned in this paragraph.

In embodiments, the gas processing system (2) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process.

In embodiments, the gas processing system (2) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process, and wherein the first gas (FG) may be evacuated from the gas processing system (2) via the first gas outlet (FG1) at any point in the process; and that the discharge gas (DG), may be supplied from the gas mixing system (3) to before, after, or in any one of the aforementioned processing steps.

In embodiments, the gas processing system (2) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process, and wherein the second gas (SG) may be evacuated from the gas processing system (2) via the second gas outlet (SG1) at any point in the process; and that the discharge gas (DG), may be supplied from the gas mixing system (3) to before, after, or in any one of the aforementioned processing steps.

In embodiments, the gas processing system (2) comprises two or three or more processing systems selected from the group consisting of a water separation process, hydrogen sulfide separation process, volatile organic compound separation process, a carbon dioxide separation process, a nitrogen separation process, and an oxygen removal process, and wherein a pressurization step may be before or after any one of the aforementioned steps.

In embodiments, the gas processing system (2) comprises one or more processing systems selected from the group consisting of water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms; and wherein the first gas (FG) and/or second gas (SG) may be evacuated from the gas processing system (2) before or after or in any one of the aforementioned processing systems; and that the discharge gas (DG), may be supplied from the gas mixing system (3) to before, after, or in any one of the aforementioned processing steps. In embodiments, the gas processing system (2) comprises a pressurization step before or after any one of the processing systems mentioned in this paragraph.

In embodiments, the gas processing system (2) comprises two or three or more processing systems selected from the group consisting of water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms.

FIG. 1 shows an initial gas (1G) supplied to the gas processing system (2) via an initial gas inlet (1G1). Within the gas processing system (2), the initial gas (1G) is processed as described above to produce a product (2G) (also described above) which is evacuated from the gas processing system (2) via a product outlet (1G2). The gas processing system (2) also discharges a first gas (FG) via a first gas outlet (FG1) and a second gas (SG) via a second gas outlet (SG1). A gas mixing system (3) is integrated within the gas purification system (1). The gas mixing system (3) is configured to accept the first gas (FG) from the first gas outlet (FG1) via a first gas inlet (FG2) of the gas mixing system (3). The gas mixing system (3) is also configured to accept the second gas (2G) from the second gas outlet (SG1) via a second gas inlet (SG2) of the gas mixing system (3). The first gas (FG) is transferred from the first gas outlet (FG1) gas processing system (2) to the first gas inlet (FG2) of the gas mixing system (3). The second gas (SG) is transferred from the second gas outlet (SG1) gas processing system (2) to the second gas inlet (SG2) of the gas mixing system (3). Within the gas mixing system (3), the first gas (FG) and the second gas (SG) are mixed to produce a discharge gas (DG). FIG. 1 shows the discharge gas (DG) transferred from discharge gas outlet (DG1) of the gas mixing system (3) to a discharge gas inlet (DG2) of the gas processing system (2).

In embodiments, the first gas (FG) is at a relatively constant pressure within the gas processing system (2). In embodiments, the first gas (FG) is transferred to the gas mixing system (3) after a pressurization step within the gas processing system (2). In embodiments, the discharge gas (DG) is transferred from the gas mixing system (3) to the gas processing system (2) before a pressurization step within the gas processing system (2).

In embodiments, the second gas (SG) varies in pressure within the gas processing system (2), and is sent to the gas mixing system (3) in a batch and/or cyclic batch mode. In embodiments, the second gas (SG) comprises a blowdown gas from a pressure swing desorption process within the gas processing system (2), and is sent to the gas mixing system (3). In embodiments, the second gas (SG) comprises a blowdown gas from a pressure swing adsorption process within the gas processing system (2), and is sent to the gas mixing system (3). In embodiments, the second gas (SG) comprises a blowdown gas from a temperature swing desorption process within the gas processing system (2), and is sent to the gas mixing system (3). In embodiments, the second gas (SG) comprises a blowdown gas from a temperature swing adsorption process within the gas processing system (2), and is sent to the gas mixing system (3). In embodiments, the second gas (SG) comprises a blowdown gas from a vacuum pressure swing desorption process within the gas processing system (2), and is sent to the gas mixing system (3). In embodiments, the second gas (SG) comprises a blowdown gas from a vacuum pressure swing adsorption process within the gas processing system (2), and is sent to the gas mixing system (3).

In embodiments, the second gas (SG) comprises a blowdown gas from a desorption process within the gas processing system (2). In embodiments, the second gas (SG) comprises a constituent from a desorption process within the gas processing system (2) (e.g.—wherein the constituent does not only include volatile organic compounds, halogenated volatile organic compounds, carbon dioxide, nitrogen, oxygen, and mixtures thereof).

In embodiments, the second gas (SG) comprises a gas that is being depressurized from a vessel operating within the gas processing system (2). In embodiments, the second gas (SG) comprises a gas that is being depressurized from a pressure swing adsorption process operating in a cyclic-batch mode within the gas processing system (2). In embodiments, the second gas (SG) comprises a gas that is being depressurized from a pressure swing desorption process operating in a cyclic-batch mode within the gas processing system (2).

An additional benefit of using the gas mixing system (3) wherein the first gas (FG) pulls a vacuum on the second gas (SG), is that, if the second gas (SG) is supplied from a vessel (or plurality of vessels) including a material that is undergoing a desorption step, the vacuum pulled on the second gas (SG) by the first gas (FG) (and the environment where it originates from within the gas processing system (2)), allows for a deeper vacuum to be pulled to increase the efficiency of the desorption and subsequent adsorption steps. In embodiments, use of a mixing system (3) that pulls a vacuum on the second gas (2G) and its origination within the gas processing system (2) can minimize assets and capital expenditure needed to pull vacuum on the adsorption or desorption step from where the second gas (2G) is supplied.

In embodiments, the second gas (SG) comprises a gas that is being depressurized from a pressure swing desorption process of an adsorbent material operating in a cyclic-batch mode within the gas processing system (2). In embodiments, the second gas (SG) comprises a gas that is being depressurized from a reaction and/or regeneration process including a material operating in a cyclic-batch mode, batch, or continuous state manner within the gas processing system (2) wherein said material may or may not comprise one or more non-limiting materials selected from the group consisting of an adsorbent, activated alumina, activated carbon, alumina, caustic, carbon, carbon nanotubes, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite.

In embodiments, the second gas (SG) comprises a gas that is being transferred from a unit operation within the gas processing system (2) wherein the unit operation comprises a material, wherein said material comprises one or more materials selected from the group consisting of an adsorbent, activated alumina, activated carbon, alumina, caustic, carbon, carbon nanotubes, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite.

In embodiments, the second gas (SG) comprises a gas that is being transferred from a reactor within the gas processing system (2). In embodiments, the second gas (SG) comprises a gas that is being transferred from a bioreactor within the gas processing system (2). In embodiments, the second gas (SG) comprises a gas that is being transferred from low pressure environment within the gas processing system (2), wherein the first gas (1G) has a relatively higher pressure than the second gas (2G).

In embodiments, the first gas (FG) has a pressure that is greater than a pressure of the second gas (SG). In embodiments, the first gas (FG) has a pressure that is greater than a pressure of the second gas (SG) and the discharge gas (DG). In embodiments, the first gas (FG) has a pressure that is greater than a pressure of the second gas (SG) and the discharge gas (DG), and the discharge gas has a pressure that is greater than or equal to a pressure of the environment within the gas processing system (2) to where the discharge gas (DG) is supplied.

In embodiments, the second gas (SG) has a pressure that is greater than or equal to a pressure of the environment within the gas processing system (2), and therefore at this period in time, the first gas (FG) is not needed to mix with and boost the pressure of the second gas (SG), because the second gas (SG) is already at a pressure that is sufficiently high enough to be supplied into an environment within the gas processing system (2). Therefore, the second gas (SG) passes through the gas mixing system (3) without mixing with the first gas (FG) to create a discharge gas (DG) consisting of the second gas (SG), which is supplied to gas processing system (2).

In embodiments, the second gas (SG) has a pressure that is lesser than a pressure of the environment within the gas processing system (2) in which it is supplied, and therefore the gas mixing system (3) is needed to use the first gas (FG) to mix with and boost the pressure of the second gas (SG) to create a discharge gas (DG) that is greater than or equal to a pressure of an environment within the gas processing system (2) to which the discharge gas (DG) is supplied.

In embodiments, the second gas (SG) passes through the gas mixing system (3) without mixing with the first gas (FG) to create a discharge gas (DG) consisting of the second gas (SG), which is supplied to gas processing system (2). In embodiments, the second gas (SG) passes through the gas mixing system (3) and mixes with the first gas (FG) to create a discharge gas (DG) comprising a mixture of the first gas (FG) and the second gas (SG), which is supplied to gas processing system (2).

In embodiments, the second gas (SG) comprises a gas that at times, is being transferred from low pressure environment within the gas processing system (2), wherein the first gas (1G) at times has a relatively higher pressure than the second gas (2G); and at times, the second gas (2G) is being transferred from high pressure environment within the gas processing system (2), wherein the first gas (1G) at times has a relatively higher pressure and/or equivalent pressure than or of the second gas (2G).

In embodiments, the second gas (SG) is evacuated from a portion of the gas processing system (2) that processes said initial gas (1G), or at least a portion of the initial gas (1G), in a closed system, and wherein the closed system processes the initial gas (1G), or at least a portion of the initial gas (1G) in a repeated cyclical manner using new batches of the initial gas (1G), or at least a portion of the initial gas (1G).

In embodiments, the second gas (SG) is evacuated from a portion of the gas processing system (2) operates in batch mode and/or cyclic batch mode. In embodiments, the second gas (SG) is evacuated from a portion of the gas processing system (2) that operates not in a continuous manner. In embodiments, the second gas (SG) is evacuated from a portion of the gas processing system (2) that operates in a continuous manner.

In embodiments, the second gas (SG) is sent to the gas mixing system (3) where the gas mixing system (3) boosts the pressure of the second gas (SG) by mixing with the first gas (FG), to create a discharge gas (DG), which is a mixture of the first gas (FG) and second gas (SG), and the discharge gas (DG) may then be supplied to the gas processing system (2) for use to produce the product (2G) therefrom.

In embodiments, the second gas (SG) is sent to the gas mixing system (3) together with the first gas (FG) so that the first gas (FG) can boost the pressure of the second gas (SG) to transfer both the mixture of the first gas (FG) and second gas (SG) as a discharge gas (DG), to be supplied to the gas processing system (2).

In embodiments, the second gas (SG) is sent to the gas mixing system (3) without the first gas (FG) since the second gas (SG) varies in flow and pressure and that the pressure of the second gas (SG) alone is sufficiently high enough to be supplied to the gas processing system (2) without the need for the first gas (FG) to boost the pressure of the second gas (SG).

In embodiments, the discharge gas (DG) comprises only the second gas (SG). In embodiments, the discharge gas (DG) comprises a mixture of the first gas (FG) and the second gas (SG), because the second gas (SG) sent to the gas mixing system (3) is not of sufficiently high enough pressure to be supplied to the relatively higher pressure of the gas processing system (2) itself, and the second gas (SG) needs the first gas (FG) to boost its pressure for it to be transferred to the gas processing system (2).

In embodiments, the second gas (SG) is sent to the gas mixing system (3) together with the first gas (FG) so that the first gas (FG) can boost the pressure of the second gas (SG) to transfer both the mixture of the first gas (FG) and second gas (SG) as a discharge gas (DG), to be supplied to the gas processing system (2).

In embodiments, the flow of the product (2G) evacuated from the product outlet (1G2) of the gas processing system (2) has a flow rate, wherein the flow rate includes one or more flow rates selected from the group consisting of 1 to 25 standard cubic feet per minute (SCFM), 25 to 100 SCFM, 100 to 500 SCFM, 500 to 1000 SCFM, 1000 to 2000 SCFM, 2000 to 3000 SCFM, 3000 to 4000 SCFM, 4000 to 5000 SCFM, 5000 to 6000 SCFM, 6000 to 7000 SCFM, 7000 to 8000 SCFM, 8000 to 9000 SCFM, 9000 to 10000 SCFM, 10000 to 15000 SCFM, and 15000 to 20000 SCFM.

In embodiments, the gas mixing system (3) as shown in FIG. 1 comprises a compressor, a jet compressor, an ejector, an eductor, a venturi jet pump, an eductor-jet pump, and/or a thermocompressor, as elaborated upon in FIGS. 15-23. In embodiments, the gas mixing system (3) produces vacuum by means of the Venturi effect.

In embodiments, the gas mixing system (3) first only accepts the second gas (SG) and none of the first gas (FG), then, second, the gas mixing system (3) accepts both the second gas (SG) together with the first gas (FG), where the first gas (FG) enters the gas mixing system (3) and converts the relatively higher pressure first gas (FG) into a high velocity jet stream within the gas mixing system (3) which in turn creates a suction and pulls a vacuum on the relatively lower pressure second gas (SG).

In embodiments, the gas mixing system (3) first only accepts the second gas (SG) and none of the first gas (FG), then, second, the gas mixing system (3) accepts both the second gas (SG) together with the first gas (FG), where the first gas (FG) enters the gas mixing system (3) and converts the high pressure first gas (FG) into a high velocity jet stream which in turn creates a suction and pulls a vacuum on the relatively lower pressure second gas (SG) to aide in regeneration of an adsorbent, wherein the second gas (SG) comprises a gas that is evacuated from a vessel in which the adsorbent is being regenerated.

In embodiments, the gas mixing system (3) operates under the principle of Bernoulli's equation to create a flow, wherein the first gas (FG) comprises a relatively higher pressure gas, to create a high-velocity within the gas mixing system (3), and as the velocity of the first gas (FG) increases its pressure decreases according to Bernoulli's equation. The decrease in pressure of the first gas (FG) within the gas mixing system (3) creates a suction effect on the second gas (SG) that draws in the second gas (SG), into the gas mixing system (3). The second gas (SG) is mixed with the high-pressure first gas (FG) and is discharged from the gas mixing system (3), where the pressure of the second gas (SG) is increased sufficiently high (because it is mixed with the first gas (FG)) to be supplied into the gas processing system (2). In embodiments, the gas mixing system (3) uses the principle of fluid dynamics to create a flow and works by using a high-pressure first gas (FG) to create a high-velocity jet of the first gas (FG) within the gas mixing system (3). As the high-velocity jet of the first gas (FG) passes through the gas mixing system (3), its velocity increases and its pressure decreases, according to Bernoulli's equation, as a result, this decrease in pressure of the first gas (FG) creates a suction effect that draws in the second gas (SG) into the gas mixing system (3). The second gas (SG) is mixed with the high-pressure first gas (FG) and is discharged from the gas mixing system as a mixture of the first gas (FG) and the second gas (SG) as a discharge gas (DG).

In embodiments, FIG. 1 describes a method comprising:

providing a gas processing system (2), said gas processing system (2) accepts a source of gas (1G), said source of gas (1G) includes and/or is derived from a source of biogas;

processing said source of gas (1G) within said gas processing system (2) to produce a first gas (FG), a second gas (SG), and a product (2G); and providing a gas mixing system (3), said gas mixing system (3) accepts said first gas (FG) and said second gas (SG) from said gas processing system (2) and mixes said first gas (FG) with said second gas (SG) to produce a discharge gas (DG); and supplying said discharge gas (DG) to said gas processing system (2), wherein at least a portion of said discharge gas (DG) is used to produce said product (2G) within said gas processing system (2).

In embodiments, FIG. 1 describes a method comprising:

providing a first gas (FG);

providing a second gas (SG);

providing a gas mixing system (3) configured to accept said first gas (FG) and said second gas (SG), and mix said first gas (FG) with said second gas (SG) to produce a discharge gas (DG), said discharge gas (DG) includes a mixture of said first gas (FG) and said second gas (SG); and:

supplying said first gas (FG) and said second gas (SG) to said gas mixing system (3) to mix said first gas (FG) with said second gas (SG) to produce said discharge gas (DG), wherein said discharge gas (DG) comprises a mixture of said first gas (FG) and said second gas (SG); and one or more selected from the group consisting of:

said first gas (FG) is derived from a source of biogas;

said second gas (SG) is derived from a source of biogas;

said second gas (SG) is derived from at least a portion of said first gas (FG);

said discharge gas (DG) is supplied to produce at least a portion of said first gas (FG) and/or said second gas (SG).

In embodiments, FIG. 1 describes a method comprising:

providing a first gas (FG);

providing a second gas (SG);

providing a gas mixing system (3) configured to operate in a plurality of modes of operation comprising:

in a first mode of operation, accepting said first gas (FG) and said second gas (SG), and mixing said first gas (FG) with said second gas (SG) within said gas mixing system (3) to produce a discharge gas (DG), said discharge gas (DG) includes a mixture of said first gas (FG) and said second gas (SG); and in a second mode of operation, accepting only said second gas (SG) and not said first gas (FG), wherein second gas (SG) passes through said gas mixing system (3);

in said first mode of operation, supplying said first gas (FG) and said second gas (SG) to said gas mixing system (3) to mix said first gas (FG) with said second gas (SG) to produce said discharge gas (DG), wherein said discharge gas (DG) comprises a mixture of said first gas (FG) and said second gas (SG); and in said second mode of operation, supplying said second gas (SG) to said gas mixing system (3) to pass through said gas mixing system without mixing with said first gas (FG).

In embodiments, in said first mode of operation, said first gas (FG) comprises a pressure greater than said second gas (SG). In embodiments, in said second mode of operation, said second gas (SG) comprises a pressure greater than said first gas (FG).

In embodiments, FIG. 1 describes a gas purification system (1), comprising:

a gas processing system (2), said gas processing system (2) accepts a source of gas (1G), said source of gas (1G) includes and/or is derived from a source of biogas; and within said gas processing system (2) processing said source of gas (1G) to produce a first gas (FG), a second gas (SG), and a product (2G); and a gas mixing system (3), said gas mixing system (3) configured to accept said first gas (FG) and said second gas (SG) from said gas processing system (2) and mix said first gas (FG) with said second gas (SG) to produce a discharge gas (DG); wherein said first gas (FG) comprises a pressure greater than said second gas (SG) to pull a vacuum on said second gas (SG) in said gas mixing system (3), wherein said discharge gas (DG) is supplied to said gas processing system (2) to produce at least a portion of said product.

In embodiments, said gas mixing system includes one or more gas mixing systems selected from the group consisting of a compressor, a jet compressor, an ejector, an eductor, venturi jet pump, eductor-jet pump, and a thermocompressor.

In embodiments, said source of gas (1G) comprises or more compounds selected from the group consisting of methane, water vapor, hydrogen sulfide, volatile organic compounds, carbon dioxide, nitrogen, and oxygen.

In embodiments, said gas processing system (2) comprises one or more processing systems selected from the group consisting of a water separation process, a hydrogen sulfide separation process, volatile organic compound separation process, a carbon dioxide separation process, a nitrogen separation process, and an oxygen removal process, and wherein the first gas (FG) may be evacuated from the gas processing system (2) via the first gas outlet (FG1) at any point in the process; and that the discharge gas (DG) may be supplied from the gas mixing system (3) to before, after, or in any one of the aforementioned processing steps.

In embodiments, said gas processing system (2) comprises a pressurization step before or after any one of said processing systems, wherein said discharge gas (DG), is supplied before said pressurization step.

In embodiments, the biogas mixing and recycling technology disclosed herein can be used to produce renewable energy products including products and processes that mitigate climate change by capturing of greenhouse gases such as methane (and carbon dioxide, nitrogen, volatile organic compounds, etc.) to make useful products. In embodiments, the biogas mixing and recycling technology disclosed herein can be used to produce renewable energy products including products and processes that mitigate climate change by employing technologies for the production of fuel of non-fossil origin not only including hydrogen, biofuels, synthetic alcohols, synthetic liquid fuels, synthetic chemicals, renewable natural gas, renewable electricity, renewable power, renewable energy. In embodiments, the biogas mixing and recycling technology disclosed herein can be used to produce renewable energy products including products and processes that mitigate climate change by employing advancements in technologies relating to agriculture and livestock or agroalimentary industries by using waste plant matter and or waste manure from livestock operations to produce new and useful products. In embodiments, the biogas mixing and recycling technology disclosed herein can be used to produce renewable energy products including products and processes that mitigate climate change by enabling technologies with a potential contribution to greenhouse gas emissions mitigation such as fuel cell and hydrogen production processes. In embodiments, the biogas mixing and recycling technology disclosed herein can be used to produce renewable energy products including products and processes that mitigate climate change by employing landfill technologies aiming to mitigate methane emissions by processing biogas from the landfill instead of allowing the methane and other gases within the biogas to permeate from the landfill surface.

FIG. 2

Figure 2:
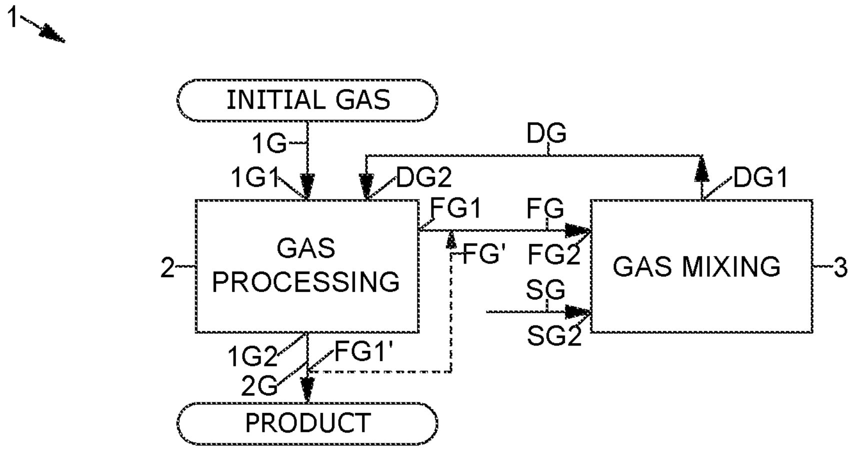
FIG. 2 depicts a non-limiting embodiment of a gas purification system (1) including a gas processing system (2) that supplies a first gas (FG) to a gas mixing system (3), and within the gas mixing system (3), mixing the first gas (FG) with a second gas (SG) to produce a discharge (DG), that is then supplied to the gas processing system (2).

FIG. 2 depicts a non-limiting embodiment of a gas purification system (1) including a gas processing system (2) that supplies a first gas (FG) to a gas mixing system (3), and within the gas mixing system (3), mixing the first gas (FG) with a second gas (SG) to produce a discharge gas (DG), that is then supplied to the gas processing system (2).

In embodiments, FIG. 2 shows the second gas (SG) not produced by the gas processing system (2) and wherein the second gas (SG) is not necessarily derived from a source of biogas and/or is not necessarily processed in said gas processing system (2).

In embodiments, FIG. 2 shows the first gas (FG) coming from said gas processing system (2) may include a first gas (FG') coming from first gas outlet (FG1') as a portion of the product (2G) produced from the gas processing system (2).

FIG. 3

Figure 3:
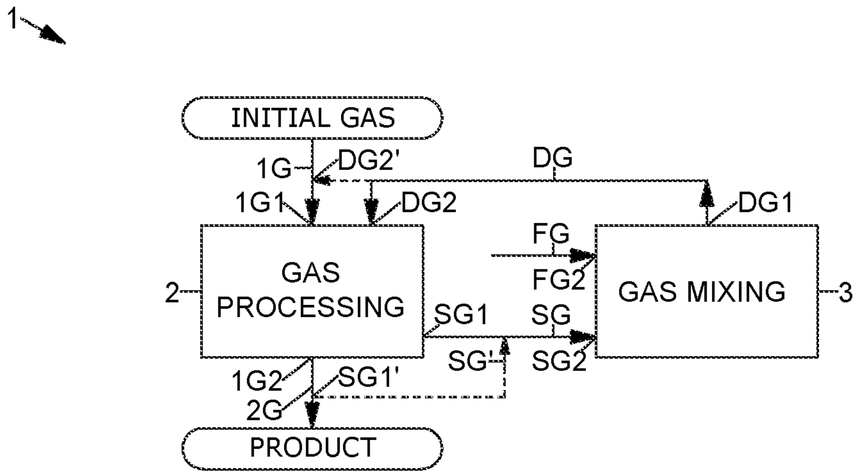
FIG. 3 depicts a non-limiting embodiment of a gas purification system (1) including a gas processing system (2) that supplies a second gas (SG) to a gas mixing system (3), and within the gas mixing system (3), mixing the second gas (SG) with a first gas (FG) to produce a or discharge (DG), that is then supplied to the gas processing system (2).

FIG. 3 depicts a non-limiting embodiment of a gas purification system (1) including a gas processing system (2) that supplies a second gas (SG) to a gas mixing system (3), and within the gas mixing system (3), mixing the second gas (SG) with a first gas (FG) to produce a discharge gas (DG), that is then supplied to the gas processing system (2).

In embodiments, FIG. 3 shows the first gas (FG) not produced by the gas processing system (2) and wherein the first gas (FG) is not necessarily derived from a source of biogas and/or is not necessarily processed in said gas processing system (2).

In embodiments, FIG. 3 shows the second gas (SG) coming from said gas processing system (2) may include a second gas (SG') coming from second gas outlet (SG1') as a portion of the product (2G) produced from the gas processing system (2).

FIG. 4

Figure 4:
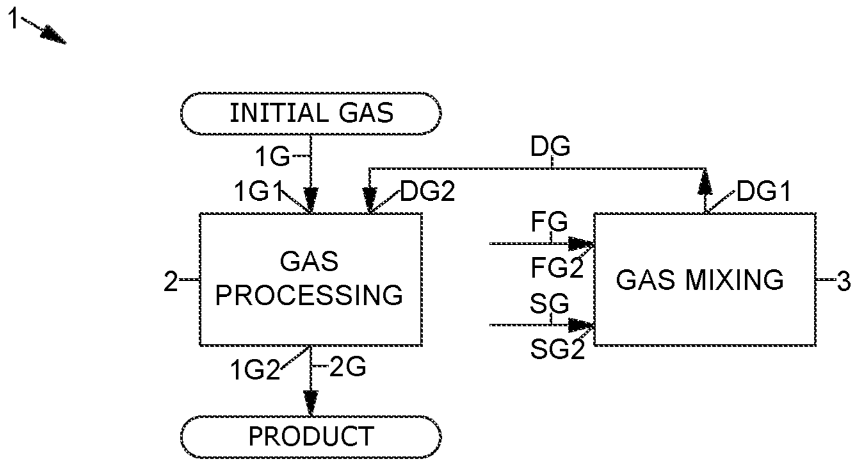
FIG. 4 depicts a non-limiting embodiment of a gas purification system (1) including a gas mixing system (3) that mixes both a first gas (FG) with a second gas (SG) to produce a discharge gas (DG), wherein the discharge gas (DG) is supplied to a gas processing system (2) which then used to produce a biogas-related product from a source of biogas and the discharge gas (DG).

FIG. 4 depicts a non-limiting embodiment of a gas purification system (1) including a gas mixing system (3) that mixes both a first gas (FG) with a second gas (SG) to produce a discharge gas (DG), wherein the discharge gas (DG) is supplied to a gas processing system (2) which is then used to produce a biogas-related product, i.e., the product (2G), from a source of biogas, i.e. the initial gas (1G), and the discharge gas (DG).

In embodiments, FIG. 4 shows the gas purification system (1) comprising a gas processing system (2) integrated with the gas mixing system (3), wherein the gas processing system (2) produces a product (2G) from both the initial gas (1G) (comprising a biogas derived gas and/or fluid) and a discharge gas (DG), wherein the discharge gas (DG) is not necessarily derived from a source of biogas, and wherein the discharge gas (DG) is derived from a first gas (FG) and/or a second gas (SG), wherein the first gas (FG) and/or the second gas (SG) is not processed nor does it originate from the said gas processing system (2). In embodiments, as shown in FIG. 4, the first gas (FG) and/or second gas (SG) could be any conceivable fluid (either a gas, vapor, and liquid, a separate biogas source, or combinations thereof).

In embodiments, the first gas (FG) and/or second gas (SG) are derived from a biogas, and are produced and transferred from a separate biogas source, and introduced to the gas purification system (1) for further processing into the product (2G).

FIG. 5

Figure 5:
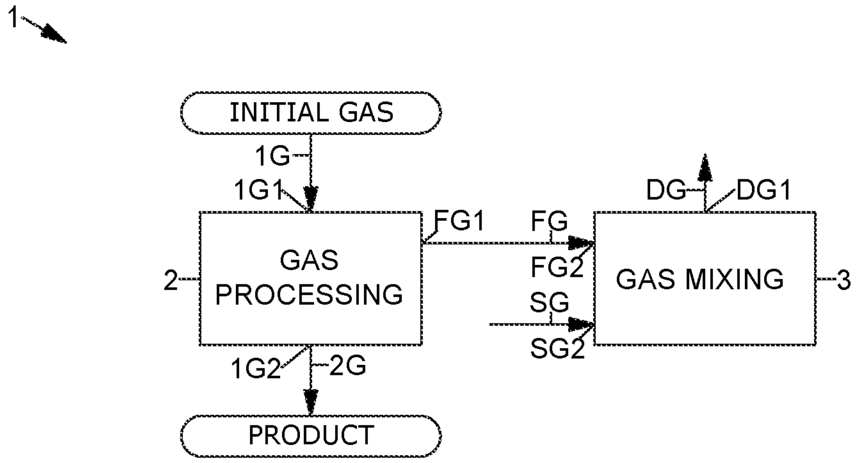
FIG. 5 depicts a non-limiting embodiment of a gas purification system (1) including a gas processing system (2) that supplies a first gas (FG) to a gas mixing system (3), and within the gas mixing system (3), mixing the first gas (FG) with a second gas (SG) to produce a discharge gas (DG), which is not supplied to the gas purification system (1).

FIG. 5 depicts a non-limiting embodiment of a gas purification system (1) including a gas processing system (2)

that supplies a first gas (FG) to a gas mixing system (3), and within the gas mixing system (3), mixing the first gas (FG) with a second gas (SG) to produce a discharge gas (DG) which is not supplied to the gas purification system (1).

In embodiments, the second gas (SG) is not processed nor does it originate from the said gas processing system (2). In embodiments, as shown in FIG. 5, the second gas (SG) could be any conceivable fluid (either a gas, vapor, and liquid, a separate biogas source, combinations thereof). FIG. 5 also shows the discharge gas (DG) not being supplied to the gas processing system (2), so therefore, the product (2G) produced by the gas purification system (1) does not include any portion of the second gas (SG) nor the discharge gas (DG) supplied to and discharged from the gas mixing system (3).

FIG. 6

Figure 6:
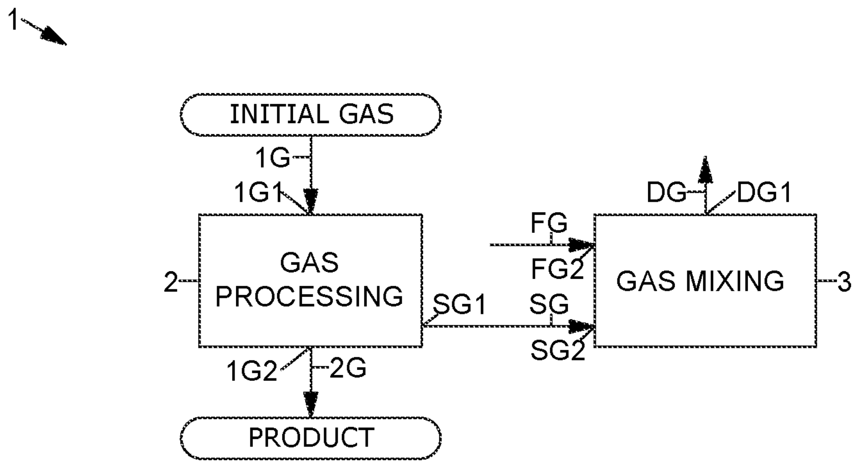
FIG. 6 depicts a non-limiting embodiment of a gas purification system (1) including a gas processing system (2) that supplies a second gas (SG) to a gas mixing system (3), and within the gas mixing system (3), mixing the second gas (SG) with a first gas (FG) to produce discharge gas (DG), which is not supplied to the gas purification system (1).

FIG. 6 depicts a non-limiting embodiment of a gas purification system (1) including a gas processing system (2) that supplies a second gas (SG) to a gas mixing system (3), and within the gas mixing system (3), mixing the second gas (SG) with a first gas (FG) to produce a discharge gas (DG), which is not supplied to the gas purification system (1).

In embodiments, the first gas (FG) is not processed nor does it originate from the said gas processing system (2). In embodiments, as shown in FIG. 6, the first gas (FG) could be any conceivable fluid (either a gas, vapor, and liquid, a separate biogas source, or combinations thereof). FIG. 6 also shows the discharge gas (DG) not being supplied to the gas processing system (2), so therefore, the product (2G) produced by the gas purification system (1) does not include any portion of the first gas (FG) nor the discharge gas (DG) supplied to and discharged from the gas mixing system (3).

FIG. 7

Figure 7:
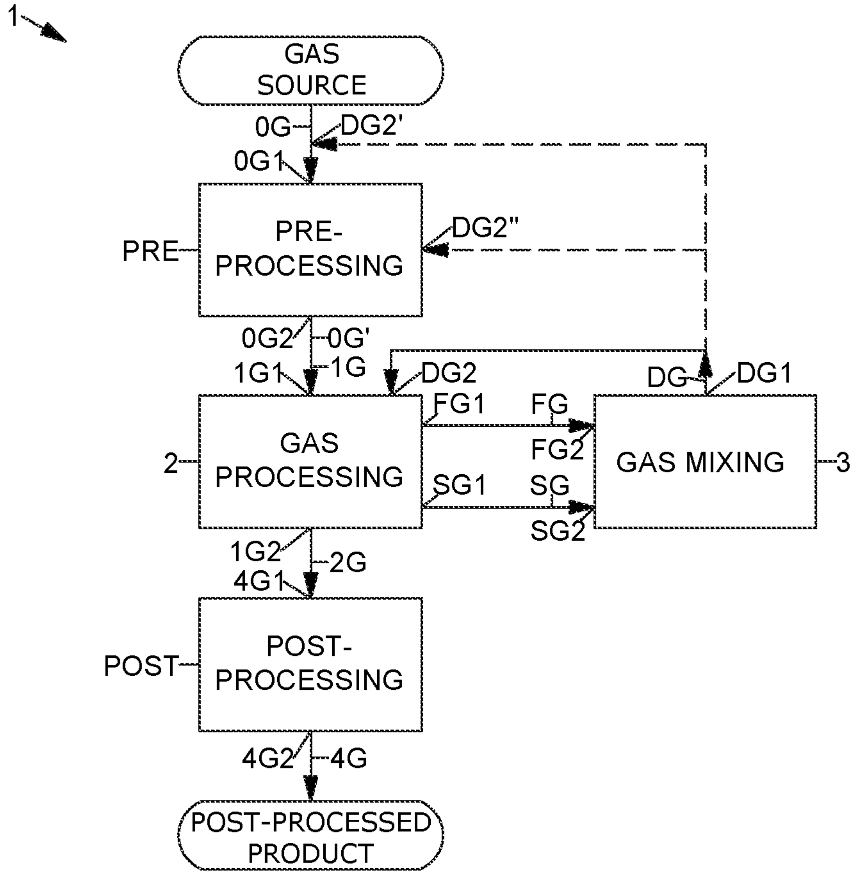
FIG. 7 depicts a non-limiting embodiment of a gas purification system (1) including a pre-processing system (PRE), a gas processing system (2), and a post-processing system (POST), wherein the gas processing system (2) supplies both a first gas (FG) and a second gas (SG) to a gas mixing system (3), where the first and second gases (FG, SG) are mixed therein to produce a discharge gas (DG), that is then supplied to either the pre-processing system (PRE) and/or the gas processing system (2).

FIG. 7 depicts a non-limiting embodiment of a gas purification system (1) including a pre-processing system (PRE), a gas processing system (2), and a post-processing system (POST), wherein the gas processing system (2) supplies both a first gas (FG) and a second gas (SG) to a gas mixing system (3), where the first and second gases (FG, SG) are mixed therein to produce a discharge gas (DG), that is then supplied to either the pre-processing system (PRE) and/or the gas processing system (2).

FIG. 7 shows a pre-processing system (PRE) accepting a source of gas (0G) via a pre-processing system inlet (0G1). In embodiments, the source of gas (0G) is derived from and/or includes at least a portion of gas that is derived from a biogas. In embodiments, the source of gas (0G) is derived from a biogas. In embodiments, the source of gas (0G) comprises a biogas. In embodiments, the source of gas (0G) comprises at least a portion of a source of biogas.

In embodiments, the pre-processing system (PRE) comprises one or more processing systems selected from the group consisting of a water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms. In embodiments, the pre-processing system (PRE) comprises a pressurization step before or after any one of the processing systems mentioned in this paragraph.

In embodiments, the pre-processing system (PRE) comprises one or more processing systems selected from the group consisting of a water separation process, a hydrogen sulfide separation process, volatile organic compound separation process, a carbon dioxide separation process, a nitrogen separation process, and an oxygen removal process.

In embodiments, the pre-processing system (PRE) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process.

In embodiments, the pre-processing system (PRE) separates a constituent from said source of gas (0G), wherein said constituent that has been separated from the source of gas (0G) includes one or more constituents selected from the group consisting of methane, water vapor, hydrogen sulfide, volatile organic compounds, methane, carbon dioxide, nitrogen, and oxygen.

In embodiments, the pre-processing system (PRE) separates an acid from said source of gas (0G) with an acid removal material, said acid removal material comprises one or more materials selected from the group consisting of an adsorbent, activated alumina, activated carbon, alumina, caustic, carbon, carbon nanotubes, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite.

In embodiments, said acid removal material comprises a mixture of water and one or more bases selected from the group consisting of: calcium hydroxide, sodium hydroxide, calcium oxide, sodium bicarbonate, ammonia, sodium carbonate, and potassium hydroxide. In embodiments, said acid removal material comprises a mixture of a solvent and one or more bases selected from the group consisting of: a hydroxide, calcium hydroxide, sodium hydroxide, calcium oxide, sodium bicarbonate, ammonia, sodium carbonate, and potassium hydroxide.

In embodiments, said acid removal material comprises a solvent. In embodiments, said acid removal material comprises mixture of a solvent and water. In embodiments, said acid removal material comprises a neutralizing agent. In embodiments, said neutralizing agent neutralizes the acid within the source of biogas with a neutral solution. In embodiments, said neutralizing agent comprises an inorganic compound, wherein said inorganic compound reacts with the acid to neutralize the acid. In embodiments, non-limiting examples of said neutralizing agent include one or more selected from the group consisting of a hydroxide, calcium carbonate, sodium bicarbonate, magnesium oxide, calcium oxide, sodium hydroxide, potassium hydroxide, ammonium hydroxide, sodium carbonate, and potassium carbonate. In embodiments, said acid removal material comprises a pH buffer. In embodiments, said pH buffer includes a zwitterionic buffer. In embodiments, said pH buffer includes a non-zwitterionic buffer.

A pre-processed gas (0G') is evacuated from the pre-processing system (PRE) via a pre-processed gas outlet (0G2) and is supplied to the gas processing system (2) as the initial gas (1G). The initial gas (1G) is supplied from the pre-processing system (PRE) as a pre-processed gas (0G') and is supplied to the gas processing system (2) for further processing and gas mixing operation. In embodiments, the pre-processed gas (0G') is provided as the initial gas (1G) enters the initial gas inlet (1G1) of the gas processing system (2) from the pre-processed gas outlet (0G2) of the pre-processing system (PRE).

The integration and operation of the gas mixing system (3) has been described in FIG. 1, however FIG. 7 shows that the entire flow or at least a portion of the discharge gas (DG) may be mixed with: the source of gas (0G) as shown by the discharge gas inlet (DG2') upstream of the pre-processing system (PRE), and/or directly supplied to the pre-processing system (PRE) the discharge gas inlet (DG2") shown to the pre-processing system (PRE).

FIG. 7 further shows the product (2G) evacuated from the gas processing system (2) is supplied to a post-processing system inlet (4G1) of the post-processing system (POST). In embodiments, the post-processing system (POST) further processes the product (2G) provided from the gas processing system (2) to produce a post-processed product (4G). FIG. 7 shows a post-processed product (4G) that is discharged from the post-processing system (POST) via a post-processed product outlet (4G2).

In embodiments, the post-processing system (POST) comprises one or more processing systems selected from the group consisting of a water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms. In embodiments, the post-processing system (POST) comprises a pressurization step before or after any one of the processing systems mentioned in this paragraph.

In embodiments, the post-processing system (POST) comprises one or more processing systems selected from the group consisting of a water separation process, a hydrogen sulfide separation process, volatile organic compound separation process, a carbon dioxide separation process, a nitrogen separation process, and an oxygen removal process. In embodiments, the post-processing system (POST) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process.

In embodiments, the post-processing system (POST) separates a constituent from said source of the product (2G) to produce a post-processed product (4G), wherein said constituent that has been separated from the product (2G) includes one or more constituents selected from the group consisting of methane, water vapor, hydrogen sulfide, volatile organic compounds, methane, carbon dioxide, nitrogen, and oxygen.

In embodiments, the post-processing system (POST) further processes the product (2G) to produce a post-processed product (4G). In embodiments, the post-processing system (POST) removes an acid from the product (2G) to produce a post-processed product (4G). In embodiments, an acid may be removed from the product (2G) within the post-processing system (POST) with an acid removal material to produce the post-processed product (4G), wherein said acid removal material comprises one or more materials selected from the group consisting of an adsorbent, activated alumina, activated carbon, alumina, caustic, carbon, carbon nanotubes, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite.

In embodiments, said acid removal material comprises a mixture of water and one or more bases selected from the group consisting of: calcium hydroxide, sodium hydroxide, calcium oxide, sodium bicarbonate, ammonia, sodium carbonate, and potassium hydroxide. In embodiments, said acid removal material comprises a mixture of a solvent and one or more bases selected from the group consisting of: a hydroxide, calcium hydroxide, sodium hydroxide, calcium oxide, sodium bicarbonate, ammonia, sodium carbonate, and potassium hydroxide.

In embodiments, said acid removal material comprises a solvent. In embodiments, said acid removal material comprises mixture of a solvent and water. In embodiments, said acid removal material comprises a neutralizing agent. In embodiments, said neutralizing agent neutralizes the acid within the product (2G) with a neutral solution. In embodiments, said neutralizing agent comprises an inorganic compound, wherein said inorganic compound reacts with the acid to neutralize the acid. In embodiments, non-limiting examples of said neutralizing agent include one or more selected from the group consisting of a hydroxide, calcium carbonate, sodium bicarbonate, magnesium oxide, calcium oxide, sodium hydroxide, potassium hydroxide, ammonium hydroxide, sodium carbonate, and potassium carbonate. In embodiments, said acid removal material comprises a pH buffer. In embodiments, said pH buffer includes a zwitterionic buffer. In embodiments, said pH buffer includes a non-zwitterionic buffer.

In embodiments, the post-processing system (POST) comprises a catalytic oxygen reduction process comprising combusting at least a portion of oxygen within the product (2G), then removing an acid, following by water separation after acid removal to produce the post-processed product (4G). In embodiments, the post-processing system (POST) is subjected to a catalytic oxygen reduction process comprising combusting at least a portion of oxygen within the product (2G) to produce the post-processed product (4G). In embodiments, the post-processing system (POST) is subjected to a catalytic oxygen reduction process comprising combusting at least a portion of oxygen within the product (2G), then removing an acid, to produce the post-processed product (4G).

Figure 8:
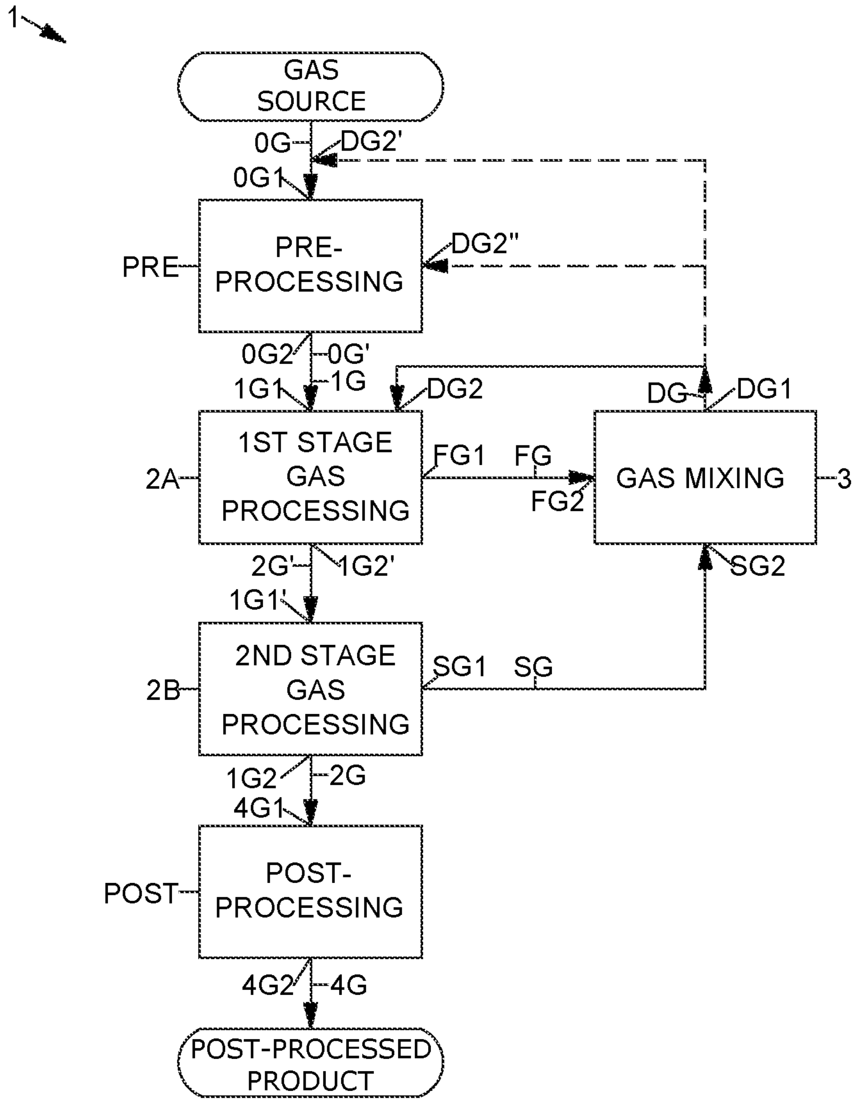
FIG. 8 depicts a non-limiting embodiment of a gas purification system (1) including a pre-processing system (PRE), a first stage gas processing system (2A), a second stage gas processing system (2B), and a post-processing system (POST), wherein the first stage gas processing system (2A) supplies a first gas (FG) to a gas mixing system (3) and the second stage gas processing system (2B) supplies a second gas (SG) to the gas mixing system (3), where the first and second gases (FG, SG) are mixed therein to produce a discharge gas (DG), that is then supplied to either the pre-processing system (PRE) and/or the first stage gas processing system (2A).
Figure 14:
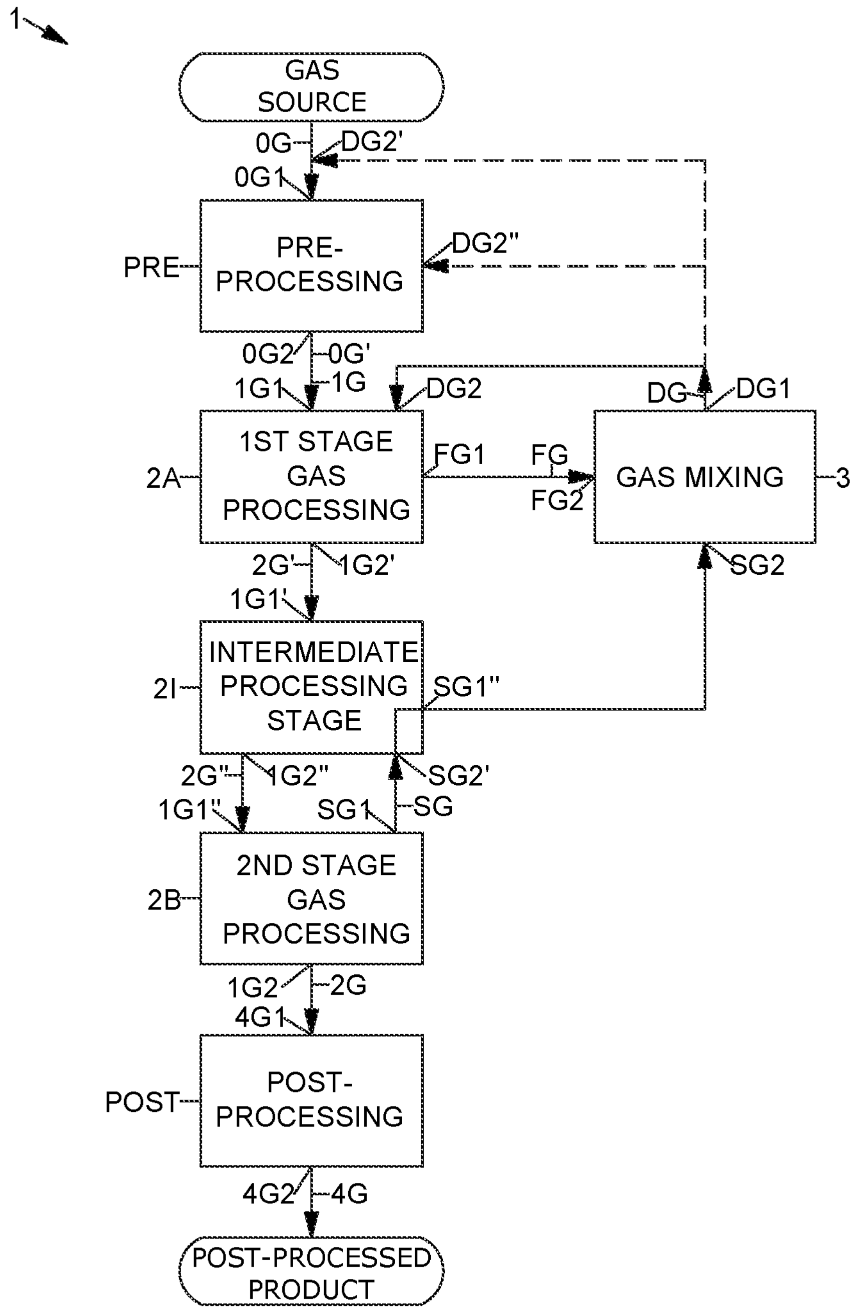
FIG. 14 depicts a non-limiting embodiment of a gas purification system (1) including a pre-processing system (PRE), a first stage gas processing system (2A), an intermediate processing stage (21), a second stage gas processing system (2B), and a post-processing system (POST), wherein the first stage gas processing system (2A) supplies a first gas (FG) to a gas mixing system (3) and the second stage gas processing system (2B) supplies a second gas (SG) to the intermediate processing stage (21) and then to the a gas mixing system (3), where the first and second gases (FG, SG) are mixed therein to produce a discharge gas (DG), that is then supplied to either the pre-processing system (PRE) and/or the first stage gas processing system (2A).

In embodiments, the post-processing system (POST) shown in any of the FIGS. 7, 8, and 14 comprises a halogenated volatile organic compound removal system configured to accept said product (2G), comprising methane, oxygen, and a halogenated volatile organic compound, and within said halogenated volatile organic compound removal system subjecting said product (2G) to a combustion process to produce a preliminary post-processed biogas, said preliminary post-processed biogas comprises a reduced amount of said oxygen, and a reduced amount of said halogenated volatile organic compound relative to said product (2G), wherein the halogen portion of said halogenated volatile organic compound is disassociated into said halogen by said combustion process, wherein said halogen combines with water vapor within said a preliminary post-processed biogas to produce an acid, said a preliminary post-processed biogas comprises said acid which is then removed with an acid removal material to product the post-processed product (4G).

FIG. 8

FIG. 8 depicts a non-limiting embodiment of a gas purification system (1) including a pre-processing system (PRE), a first stage gas processing system (2A), a second stage gas processing system (2B), and a post-processing system (POST), wherein the first stage gas processing system (2A) supplies a first gas (FG) to a gas mixing system (3) and the second stage gas processing system (2B) supplies a second gas (SG) to the gas mixing system (3), where the first and second gases (FG, SG) are mixed therein to produce a discharge gas (DG), that is then supplied from a discharge gas outlet (DG1) to either the pre-processing system (PRE) and/or the first stage gas processing system (2A). The discharge gas (DG) is supplied to the pre-processing system (PRE) by either mixing with the source of gas (0G) via the discharge gas inlet (DG2') upstream from the pre-processing inlet (0G1) and/or directly via a discharge gas inlet (DG2") of the pre-processing system (PRE).

FIG. 8 elaborates upon the gas purification system (1) as depicted in FIG. 7, however, in FIG. 8, the second gas (SG) is provided from a second gas outlet (SG1) on the second stage gas processing system (2B). FIG. 8 shows two gas processing stages (2A and 2B) in between the pre-processing system (PRE) and the post-processing system (POST). Specifically, the pre-processed gas (0G') is supplied to a first stage gas processing system (2A) as the initial gas (1G).

In embodiments, first stage gas processing system (2A) comprises one or more processing systems selected from the group consisting of a water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms. In embodiments, the first stage gas processing system (2A) comprises a pressurization step before or after any one of the processing systems mentioned in this paragraph.

In embodiments, the first stage gas processing system (2A) comprises a volatile organic compounds removal step. In embodiments, the first stage gas processing system (2A) comprises a volatile organic compounds removal step employing adsorption. In embodiments, the first stage gas processing system (2A) comprises a volatile organic compounds removal step employing pressure swing adsorption. In embodiments, the first stage gas processing system (2A) comprises a volatile organic compounds removal step employing vacuum pressure swing adsorption.

In embodiments, the first stage gas processing system (2A) comprises a carbon dioxide removal step. In embodiments, the first stage gas processing system (2A) comprises a carbon dioxide removal step employing adsorption. In embodiments, the first stage gas processing system (2A) comprises a carbon dioxide removal step employing pressure swing adsorption. In embodiments, the first stage gas processing system (2A) comprises a carbon dioxide removal step employing a membrane and/or a plurality of membranes. In embodiments, the first stage gas processing system (2A) comprises a nitrogen removal step. In embodiments, the first stage gas processing system (2A) comprises a nitrogen removal step employing adsorption. In embodiments, the first stage gas processing system (2A) comprises a nitrogen removal step employing pressure swing adsorption. In embodiments, the first stage gas processing system (2A) comprises a nitrogen removal step employing a membrane and/or a plurality of membranes.

In embodiments, first stage gas processing system (2A) comprises one or more processing systems selected from the group consisting of a water separation process, a hydrogen sulfide separation process, volatile organic compound separation process, a carbon dioxide separation process, a nitrogen separation process, and an oxygen removal process. In embodiments, the first stage gas processing system (2A) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process.

In embodiments, first stage gas processing system (2A) separates a constituent from said source of the initial gas (1G) (obtained from the processing system (POST) as the pre-processed gas (0G')) to produce a first intermediate processed gas (2G'), wherein said constituent that has been separated from the initial gas (1G) includes one or more constituents selected from the group consisting of methane, water vapor, hydrogen sulfide, volatile organic compounds, methane, carbon dioxide, nitrogen, and oxygen.

In embodiments, the first stage gas processing system (2A) processes the initial gas (1G) to produce a first intermediate processed gas (2G'). In embodiments, the first stage gas processing system (2A) removes an acid from the initial gas (1G) to produce a first intermediate processed gas (2G'). In embodiments, the first stage gas processing system (2A) is subjected to a catalytic oxygen removal process comprising combusting at least a portion of oxygen within the initial gas (1G), then removing an acid, following by water separation after acid removal to produce the first intermediate processed gas (2G'). In embodiments, the first intermediate processed gas (2G') is subjected to a catalytic oxygen removal process comprising combusting at least a portion of oxygen within the initial gas (1G) to produce the first intermediate processed gas (2G'). In embodiments, the first stage gas processing system (2A) is subjected to a catalytic oxygen removal process comprising combusting at least a portion of oxygen (and/or a halogenated volatile organic compound, to produce an acid) within the initial gas (1G), then removing the acid, to produce the first intermediate processed gas (2G').

In embodiments, an acid may be removed from the initial gas (1G) within the first stage gas processing system (2A) with an acid removal material to produce the first intermediate processed gas (2G'), wherein said acid removal material comprises one or more materials selected from the group consisting of an adsorbent, activated alumina, activated carbon, alumina, caustic, carbon, carbon nanotubes, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite.

In embodiments, said acid removal material comprises a mixture of water and one or more bases selected from the group consisting of: calcium hydroxide, sodium hydroxide, calcium oxide, sodium bicarbonate, ammonia, sodium carbonate, and potassium hydroxide. In embodiments, said acid removal material comprises a mixture of a solvent and one or more bases selected from the group consisting of: a hydroxide, calcium hydroxide, sodium hydroxide, calcium oxide, sodium bicarbonate, ammonia, sodium carbonate, and potassium hydroxide.

In embodiments, said acid removal material comprises a solvent. In embodiments, said acid removal material comprises mixture of a solvent and water. In embodiments, said acid removal material comprises a neutralizing agent. In embodiments, said neutralizing agent neutralizes the acid within the initial gas (1G) with a neutral solution. In embodiments, said neutralizing agent comprises an inorganic compound, wherein said inorganic compound reacts with the acid to neutralize the acid. In embodiments, non-limiting examples of said neutralizing agent include one or more selected from the group consisting of a hydroxide, calcium carbonate, sodium bicarbonate, magnesium oxide, calcium oxide, sodium hydroxide, potassium hydroxide, ammonium hydroxide, sodium carbonate, and potassium carbonate. In embodiments, said acid removal material comprises a pH buffer. In embodiments, said pH buffer includes a zwitterionic buffer. In embodiments, said pH buffer includes a non-zwitterionic buffer.

FIG. 8 shows the first stage gas processing system (2A) accepting the pre-processed gas (0G') from the pre-processing system (PRE) as the initial gas (1G) and processing therein to produce a first intermediate processed gas (2G') that is evacuated from the first stage gas processing system (2A) via a first intermediate processed gas outlet (1G2'). The first intermediate processed gas (2G') discharged from the first intermediate processed gas outlet (1G2') of the first stage gas processing system (2A) is then supplied to the first intermediate processed gas inlet (1G1') of a second stage gas processing system (2B). The second stage gas processing system (2B) further processes the first intermediate processed gas (2G') to produce the product (2G).

In embodiments, the second stage gas processing system (2B) comprises one or more processing systems selected from the group consisting of a water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms. In embodiments, the second stage gas processing system (2B) comprises a pressurization step before or after any one of the processing systems mentioned in this paragraph. The second stage gas processing system (2B) comprises a carbon dioxide removal step. In embodiments, the second stage gas processing system (2B) comprises a carbon dioxide removal step employing adsorption. In embodiments, the second stage gas processing system (2B) comprises a carbon dioxide removal step employing pressure swing adsorption. In embodiments, the second stage gas processing system (2B) comprises a carbon dioxide removal step employing vacuum pressure swing adsorption. In embodiments, the second stage gas processing system (2B) comprises a carbon dioxide removal step employing a membrane. In embodiments, the second stage gas processing system (2B) comprises a nitrogen removal step. In embodiments, the second stage gas processing system (2B) comprises a nitrogen removal step employing adsorption. In embodiments, the second stage gas processing system (2B) comprises a nitrogen removal step employing pressure swing adsorption. In embodiments, the second stage gas processing system (2B) comprises a nitrogen removal step employing vacuum pressure swing adsorption. In embodiments, the second stage gas processing system (2B) comprises a nitrogen removal step employing a membrane.

In embodiments, the second stage gas processing system (2B) comprises one or more processing systems selected from the group consisting of a water separation process, a hydrogen sulfide separation process, volatile organic compound separation process, a carbon dioxide separation process, a nitrogen separation process, and an oxygen removal process. In embodiments, the second stage gas processing system (2B) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process.

In embodiments, the second stage gas processing system (2B) separates a constituent from first intermediate processed gas (2G') to produce the product (2G), wherein said constituent that has been separated from the first intermediate processed gas (2G') includes one or more constituents selected from the group consisting of methane, water vapor, hydrogen sulfide, volatile organic compounds, methane, carbon dioxide, nitrogen, oxygen.

In embodiments, the second stage gas processing system (2B) processes the first intermediate processed gas (2G') to produce the product (2G). In embodiments, the second stage gas processing system (2B) removes an acid from the first intermediate processed gas (2G') to produce a product (2G). In embodiments, the second stage gas processing system (2B) is subjected to a catalytic oxygen removal process comprising combusting at least a portion of oxygen within the first intermediate processed gas (2G'), then removing an acid, following by water separation after acid removal to produce the product (2G). In embodiments, the first intermediate processed gas (2G') is subjected to a catalytic oxygen removal process comprising combusting at least a portion of oxygen within the first intermediate processed gas (2G') to produce the product (2G). In embodiments, the first intermediate processed gas (2G') is subjected to a catalytic oxygen removal process comprising combusting at least a portion of oxygen (and/or a halogenated volatile organic compound to produce the acid) within the first intermediate processed gas (2G'), then removing the acid, to produce the product (2G).

In embodiments, an acid may be removed from the first intermediate processed gas (2G') within the second stage gas processing system (2B) with an acid removal material to produce the product (2G), wherein said acid removal material comprises one or more materials selected from the group consisting of an adsorbent, activated alumina, activated carbon, alumina, caustic, carbon, carbon nanotubes, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite.

In embodiments, said acid removal material comprises a mixture of water and one or more bases selected from the group consisting of: a hydroxide, calcium hydroxide, sodium hydroxide, calcium oxide, sodium bicarbonate, ammonia, sodium carbonate, and potassium hydroxide. In embodiments, said acid removal material comprises a mixture of a solvent and one or more bases selected from the group consisting of: a hydroxide, calcium hydroxide, sodium hydroxide, calcium oxide, sodium bicarbonate, ammonia, sodium carbonate, and potassium hydroxide. In embodiments, said acid removal material comprises a liquid scrubbing comprising a base.

In embodiments, said acid removal material comprises a solvent. In embodiments, said acid removal material comprises mixture of a solvent and water. In embodiments, said acid removal material comprises a neutralizing agent. In embodiments, said neutralizing agent neutralizes the acid within the first intermediate processed gas (2G') with a neutral solution. In embodiments, said neutralizing agent comprises an inorganic compound, wherein said inorganic compound reacts with the acid to neutralize the acid. In embodiments, non-limiting examples of said neutralizing agent include one or more selected from the group consisting of a hydroxide, calcium carbonate, sodium bicarbonate, magnesium oxide, calcium oxide, sodium hydroxide, potassium hydroxide, ammonium hydroxide, sodium carbonate, and potassium carbonate. In embodiments, said acid removal material comprises a pH buffer. In embodiments, said pH buffer includes a zwitterionic buffer. In embodiments, said pH buffer includes a non-zwitterionic buffer.

FIG. 9

Figure 9:
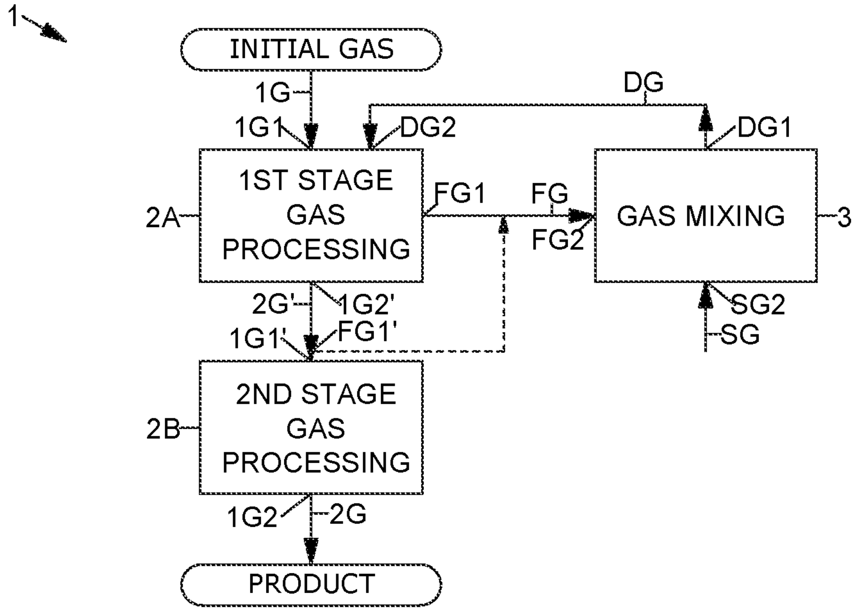
FIG. 9 depicts a non-limiting embodiment of a gas purification system (1) including a first stage gas processing system (2A), a second stage gas processing system (2B), and a gas mixing system (3), wherein the first stage gas processing system (2A) supplies a first gas (FG) to the first gas inlet (FG1) of the a gas mixing system (3), where the first gas (FG) is mixed with a second gas (SG) therein to produce a discharge gas (DG), that is then supplied to the first stage gas processing system (2A).

FIG. 9 depicts a non-limiting embodiment of a gas purification system (1) including a first stage gas processing system (2A), a second stage gas processing system (2B), and a gas mixing system (3), wherein the first stage gas processing system (2A) supplies a first gas (FG) to the first gas inlet (FG2) of the a gas mixing system (3), where the first gas (FG) is mixed with a second gas (SG) therein to produce a discharge gas (DG), that is then supplied to the first stage gas processing system (2A).

FIG. 9 shows a non-limiting embodiment of a gas purification system (1) comprising a first stage gas processing system (2A), a second stage gas processing system (2B), integrated with a gas mixing system (3). Specifically, FIG. 9 is similar to the configuration of FIG. 2, however, FIG. 9 shows the second gas (SG) not produced by the gas processing system (2), or in the case of FIG. 9, the first stage gas processing system (2A) and the second stage gas processing system (2B), and wherein the second gas (SG) is not necessarily derived from a source of biogas and/or is not necessarily processed in either the first stage gas processing system (2A) or the second stage gas processing system (2B). In embodiments, the second gas (SG) is derived from a separate source of biogas and is mixed with the biogas-derived first gas (FG) for introduction into the gas purification system (1). FIG. 9 shows the first gas (FG) entering the gas mixing system (3) as coming from the first stage gas processing system (2A) and/or as a portion of the first intermediate processed gas (2G') produced from the first stage gas processing system (2A).

FIG. 10

Figure 10:
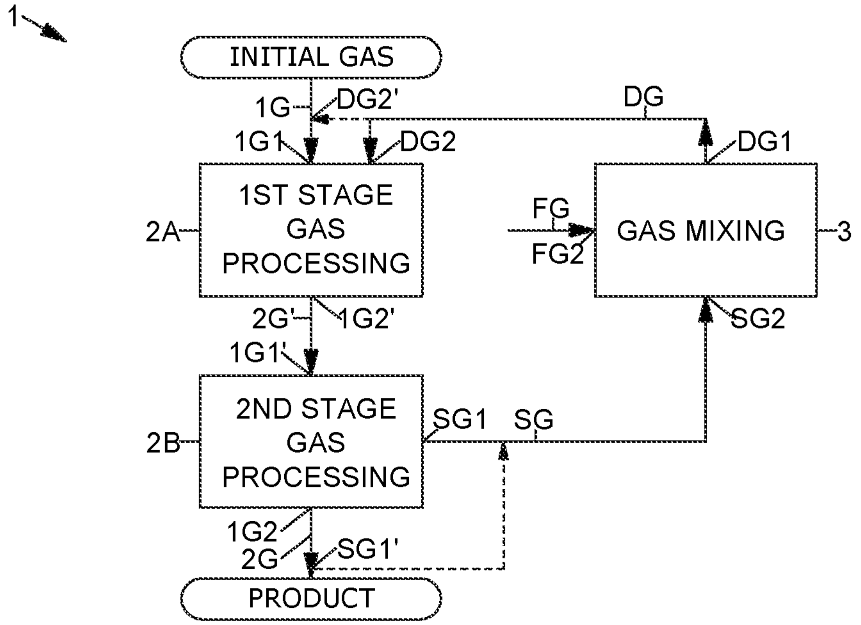
FIG. 10 depicts a non-limiting embodiment of a gas purification system (1) including a first stage gas processing system (2A), a second stage gas processing system (2B), and a gas mixing system (3), wherein the second stage gas processing system (2B) supplies a second gas (SG) to the second gas inlet (SG2) of the gas mixing system (3), where the second gas (SG) is mixed with a first gas (FG) therein to produce a discharge gas (DG), that is then supplied to the first stage gas processing system (2A) and/or mixed with the initial gas (1G).

FIG. 10 depicts a non-limiting embodiment of a gas purification system (1) including a first stage gas processing system (2A), a second stage gas processing system (2B), and a gas mixing system (3), wherein the second stage gas processing system (2B) supplies a second gas (SG) to the second gas inlet (SG2) of the gas mixing system (3), where the second gas (SG) is mixed with a first gas (FG) therein to produce a discharge gas (DG), that is then supplied to the first stage gas processing system (2A) and/or mixed with the initial gas (1G).

FIG. 10 shows a non-limiting embodiment of a gas purification system (1) comprising a first stage gas processing system (2A), a second stage gas processing system (2B), integrated with a gas mixing system (3). Specifically, FIG. 10 is similar to the configuration of FIG. 3, however, FIG. 10 shows the first gas (FG) not produced by either the first stage gas processing system (2A) or the second stage gas processing system (2B) and wherein the first gas (FG) is not necessarily derived from a source of biogas and/or is not necessarily processed in said gas processing system (2), or the first stage gas processing system (2A) and the second stage gas processing system (2B) as specified in FIG. 10. In embodiments, the first gas (FG) is derived from a separate source of biogas and is mixed with the biogas-derived second gas (SG) for introduction into the gas purification system (1). FIG. 10 shows the second gas (SG) coming from the second stage gas processing system (2B) and/or as a portion of the product (2G) produced from the second stage gas processing system (2B).

FIG. 10 also shows the discharge gas (DG) evacuated from the gas mixing system (3) and provided to be supplied directly to first stage gas processing system (2A) via an inlet (DG2) and/or to be mixed with the initial gas via inlet (DG2') and supplied to the initial gas inlet (1G1) of the first stage gas processing system (2A). In embodiments, the second gas (SG) may be supplied to the second gas inlet (SG2) via a second gas outlet (SG1') installed after the product outlet (1G2), to permit at least a portion of the product (2G) to be supplied as the second gas (SG).

FIG. 11

Figure 11:
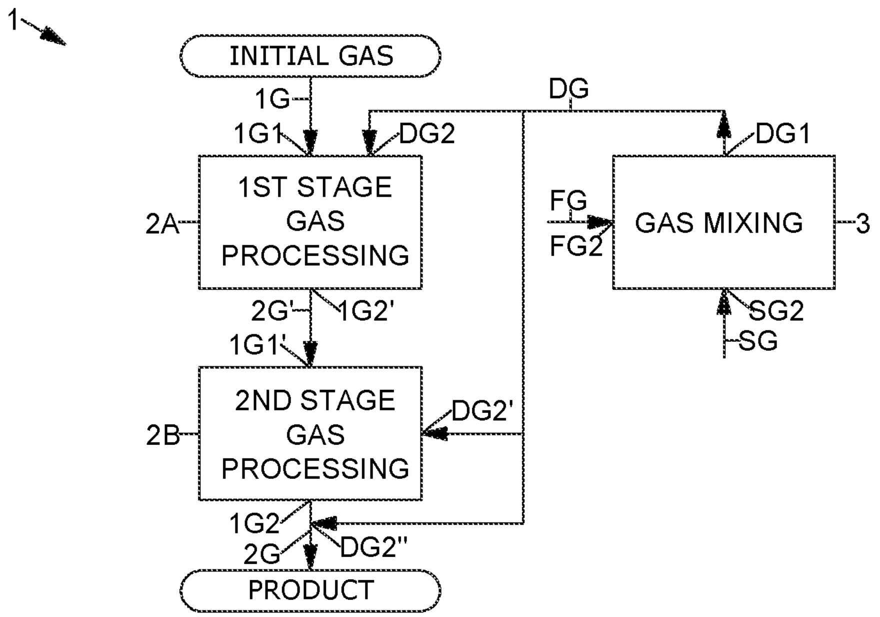
FIG. 11 depicts a non-limiting embodiment of a gas purification system (1) with a gas mixing system (3) that mixes both a first gas (FG) with a second gas (SG) to produce a discharge gas (DG), wherein the discharge gas (DG) is supplied to either a first stage gas processing system (2A), a second stage gas processing system (2B), and/or downstream of the second stage gas processing system (2B), to produce biogas-related product from a source of biogas and the discharge gas (DG).

FIG. 11 depicts a non-limiting embodiment of a gas purification system (1) with a gas mixing system (3) that mixes both a first gas (FG) with a second gas (SG) to produce a discharge gas (DG), wherein the discharge gas (DG) is supplied to either a first stage gas processing system (2A), a second stage gas processing system (2B), and/or downstream of the second stage gas processing system (2B) (e.g.—to be mixed with the product (2G)), to produce biogas-related product from a source of biogas and the discharge gas (DG).

FIG. 11 shows a non-limiting embodiment of a gas purification system (1) comprising a first stage gas processing system (2A), a second stage gas processing system (2B), integrated with a gas mixing system (3). Specifically, FIG. 11 is similar to the configuration of FIG. 4, however, FIG. 11 shows the second stage gas processing system (2B) producing a product (2G) from both the initial gas (1G) (comprising a biogas derived gas and/or a separate fluid) and a discharge gas (DG), wherein the discharge gas (DG) is not necessarily derived in its entirety or at all from a source of biogas, and wherein the discharge gas (DG) is derived from a first gas (FG) and/or a second gas (SG), wherein the first gas (FG) and/or the second gas (SG) is not processed nor does it originate from either the first stage gas processing system (2A) or the second stage gas processing system (2B).

In embodiments, as shown in FIG. 11, the first gas (FG) and/or second gas (SG) could be any conceivable fluid (either a gas, vapor, and liquid, a separate biogas source, or combinations thereof). In embodiments, the first gas (FG) and/or the second gas (SG) are both or one of the two are derived from a separate source of biogas and are then mixed together within the biogas mixing system (3) for introduction into the gas purification system (1). FIG. 11 also shows that at least a portion of the discharge gas (DG) discharged from the gas mixing system (3) is provided to the first stage gas processing system (2A) (via inlet DG2), second stage gas processing system (2B) (via inlet DG2'), and/or mixed with the product (2G) (via inlet DG2").

FIG. 12

Figure 12:
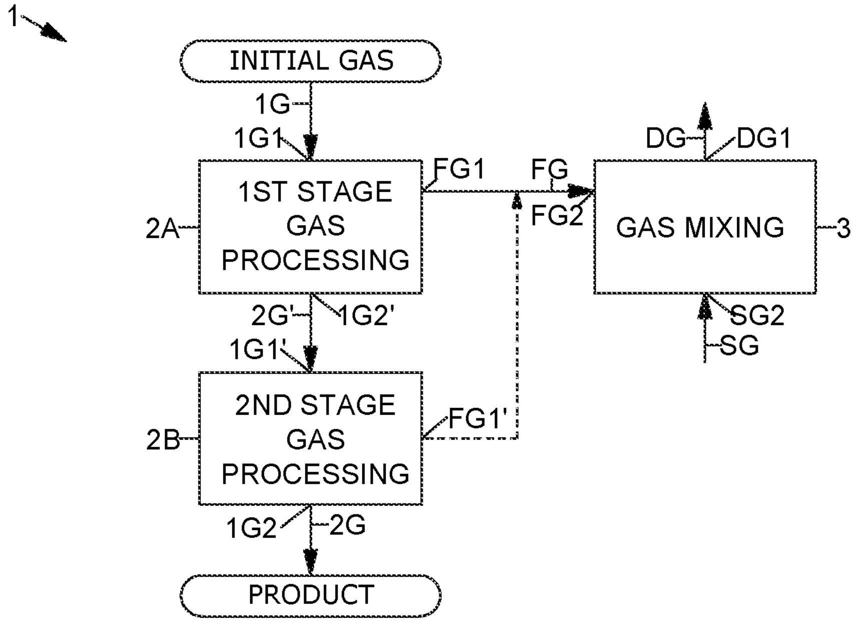
FIG. 12 depicts a non-limiting embodiment of a gas purification system (1) including a first stage gas processing system (2A), and a second stage gas processing system (2B), wherein the first stage gas processing system (2A) and/or the second stage gas processing system (2B) supplies a first gas (FG) to a gas mixing system (3), and within the gas mixing system (3), and mixing the first gas (FG) with a second gas (SG) to produce a discharge gas (DG), which is not supplied to the gas purification system (1).

FIG. 12 depicts a non-limiting embodiment of a gas purification system (1) including a first stage gas processing system (2A), and a second stage gas processing system (2B), wherein the first stage gas processing system (2A) and/or the second stage gas processing system (2B) supplies a first gas (FG) to a gas mixing system (3), and within the gas mixing system (3), and mixing the first gas (FG) with a second gas (SG) to produce a discharge gas (DG), which is not supplied to the gas purification system (1).

FIG. 12 shows a non-limiting embodiment of a gas purification system (1) comprising a first stage gas processing system (2A), a second stage gas processing system (2B), integrated with a gas mixing system (3). Specifically, FIG. 12 is similar to the configuration of FIG. 5, however, FIG. 12 shows the second gas (SG) is not processed nor does it originate from either the first stage gas processing system (2A) or the second stage gas processing system (2B). In embodiments, as shown in FIG. 12, the second gas (SG) could be any conceivable fluid (either a gas, vapor, and liquid, a separate biogas source, combinations thereof). FIG. 12 also shows the discharge gas (DG) not being supplied to either the first stage gas processing system (2A) or the second stage gas processing system (2B), so therefore, the product (2G) produced by the second stage gas processing system (2B) does not include any portion of the second gas (SG) nor the discharge gas (DG) supplied to and discharged from the gas mixing system (3).

FIG. 13

Figure 13:
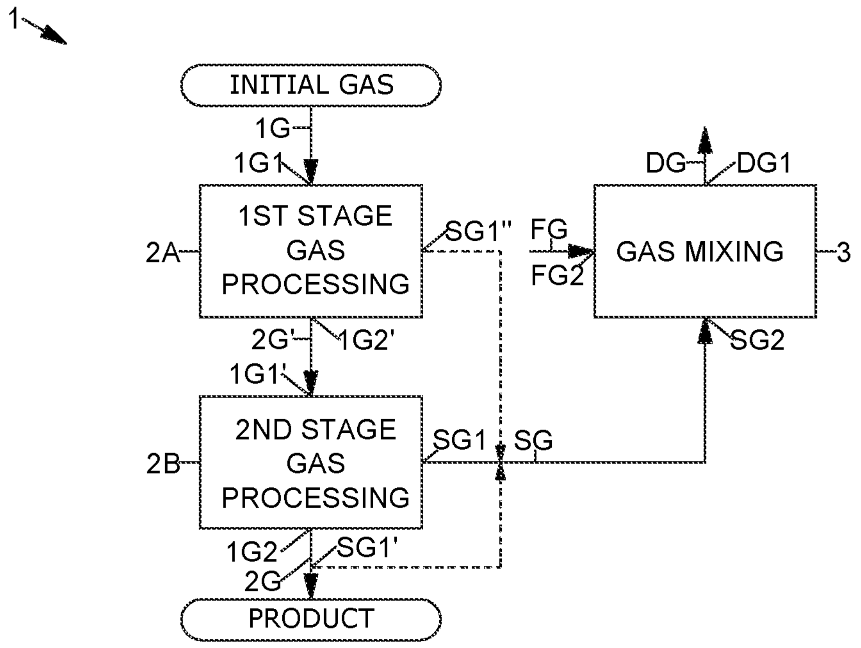
FIG. 13 depicts a non-limiting embodiment of a gas purification system (1) including a first stage gas processing system (2A), and a second stage gas processing system (2B), wherein the first stage gas processing system (2A) and/or the second stage gas processing system (2B) supplies a second gas (SG) to a gas mixing system (3), and within the gas mixing system (3), and mixing the second gas (SG) with a first gas (FG) to produce a discharge gas (DG), which is not supplied to the gas purification system (1).

FIG. 13 depicts a non-limiting embodiment of a gas purification system (1) including a first stage gas processing system (2A), and a second stage gas processing system (2B), wherein a second gas (SG) is supplied to a gas mixing system (3) by the first stage gas processing system (2A) via second gas outlet (SG1"), the second stage gas processing system (2B) via second gas outlet (SG1), and/or downstream from the second stage gas processing system (2B) via gas outlet (SG1'). Within the gas mixing system (3), and mixing the second gas (SG) with a first gas (FG) to produce a discharge gas (DG), which is not supplied to the gas purification system (1).

FIG. 13 shows a non-limiting embodiment of a gas purification system (1) comprising a first stage gas processing system (2A), a second stage gas processing system (2B), integrated with a gas mixing system (3). Specifically, FIG. 13 is similar to the configuration of FIG. 6, however, FIG. 13 shows the first gas (FG) is not processed nor does it originate from the either the first stage gas processing system (2A) or the second stage gas processing system (2B). In embodiments, as shown in FIG. 13, the first gas (FG) could be any conceivable fluid (either a gas, vapor, and liquid, a separate biogas source, combinations thereof). FIG. 13 also shows the discharge gas (DG) not being supplied to either the first stage gas processing system (2A) or the second stage gas processing system (2B), so therefore, the product (2G) produced by the second stage gas processing system (2B) does not include any portion of the first gas (FG) nor the discharge gas (DG) supplied to and discharged from the gas mixing system (3).

FIG. 14

FIG. 14 depicts a non-limiting embodiment of a gas purification system (1) including a pre-processing system (PRE), a first stage gas processing system (2A), an intermediate processing stage (21), a second stage gas processing system (2B), and a post-processing system (POST), wherein the first stage gas processing system (2A) supplies a first gas (FG) to a gas mixing system (3) and the second stage gas processing system (2B) supplies a second gas (SG) to the intermediate processing stage (21) and then to the a gas mixing system (3), where the first and second gases (FG, SG) are mixed therein to produce a discharge gas (DG), that is then supplied to either the pre-processing system (PRE) and/or the first stage gas processing system (2A).

FIG. 14 elaborates upon the disclosure of FIG. 8 and depicts an intermediate processing stage (21) interposed in between the first stage gas processing system (2A) and the second stage gas processing system (2B).

FIG. 14 shows the intermediate processing stage (21) accepting the first intermediate processed gas (2G') from the first intermediate processed gas outlet (1G2') of the first stage gas processing system (2A), and performing an intermediate or further processing step upon the first intermediate processed gas (2G') to produce a second intermediate processed gas (2G"). In turn, the second intermediate processed gas (2G") is evacuated from the intermediate processing stage (21) via an outlet (1G2") and is supplied to the inlet (1G1") of the second stage gas processing system (2B), for further processing.

In embodiments, intermediate processing stage (21) comprises one or more processing systems selected from the group consisting of a water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, an ethanol production process, an alcohol production process, a liquid fuel production process, a Fischer Tropsch synthesis process, a steam methane reforming process, a catalytic process, an ammonia production process, processing in a fuel cell, and a bioreactor including microorganisms. In embodiments, the intermediate processing stage (21) comprises a pressurization step before or after any one of the processing systems mentioned in this paragraph.

In embodiments, the intermediate processing stage (21) comprises a volatile organic compounds removal step. In embodiments, the intermediate processing stage (21) comprises a volatile organic compounds removal step employing adsorption, pressure swing adsorption, vacuum pressure swing adsorption, and/or temperature swing adsorption. In embodiments, the intermediate processing stage (21) comprises an adsorption step. In embodiments, the intermediate processing stage (21) comprises a volatile organic compounds removal step employing pressure swing adsorption, vacuum pressure swing adsorption, and/or temperature swing adsorption.

In embodiments, intermediate processing stage (21) comprises a carbon dioxide removal step. In embodiments, intermediate processing stage (21) comprises a carbon dioxide removal step employing adsorption, pressure swing adsorption, vacuum pressure swing adsorption, and/or temperature swing adsorption. In embodiments, intermediate processing stage (21) comprises a carbon dioxide removal step employing a membrane. In embodiments, intermediate processing stage (21) comprises a nitrogen removal step. In embodiments, intermediate processing stage (21) comprises a nitrogen removal step employing adsorption, pressure swing adsorption, vacuum pressure swing adsorption, and/or temperature swing adsorption. In embodiments, intermediate processing stage (21) comprises a membrane processing step.

In embodiments, intermediate processing stage (21) comprises one or more processing systems selected from the group consisting of a water separation process, a hydrogen sulfide separation process, volatile organic compound separation process, a carbon dioxide separation process, a nitrogen separation process, and an oxygen removal process. In embodiments, the intermediate processing stage (21) comprises a pressurization step before or after any one of the processing systems selected from the group consisting of a water separation process, a hydrogen sulfide separation process, volatile organic compound separation process, a carbon dioxide separation process, a nitrogen separation process, and an oxygen removal process.

In embodiments, intermediate processing stage (21) separates a constituent from said first intermediate processed gas (2G') to produce a second intermediate processed gas (2G"), wherein said constituent separated from the first intermediate processed gas (2G') includes one or more constituents selected from the group consisting of methane, water vapor, hydrogen sulfide, volatile organic compounds, methane, carbon dioxide, nitrogen, oxygen.

In embodiments, the first stage gas processing system (2A) processes the first intermediate processed gas (2G') to produce a second intermediate processed gas (2G"). In embodiments, the intermediate processing stage (21) removes an acid from the first intermediate processed gas (2G') to produce a second intermediate processed gas (2G"). In embodiments, the first intermediate processed gas (2G') is subjected to a catalytic oxygen reduction process comprising combusting at least a portion of oxygen within the first intermediate processed gas (2G'), then removing an acid (which may or may not be generated in the catalytic oxygen reduction process, as described above), followed by water separation after acid removal to produce the second intermediate processed gas (2G"). In embodiments, the first intermediate processed gas (2G') is subjected to a catalytic oxygen reduction process comprising combusting at least a portion of oxygen within the first intermediate processed gas (2G') to produce the second intermediate processed gas (2G"). In embodiments, the first intermediate processed gas (2G') is subjected to a catalytic oxygen reduction process comprising combusting at least a portion of oxygen within the first intermediate processed gas (2G'), then removing an acid, to produce the second intermediate processed gas (2G"). In embodiments, the catalytic oxygen reduction process removes the oxygen from the biogas by combustion the oxygen and therefore may be considered an oxygen removal process.

In embodiments, an acid may be removed from the first intermediate processed gas (2G') within the intermediate processing stage (21) with an acid removal material to produce the second intermediate processed gas (2G"), wherein said acid removal material comprises one or more materials selected from the group consisting of an adsorbent, activated alumina, activated carbon, alumina, caustic, carbon, carbon nanotubes, catalyst, ceramic material, chitosan, chitin, clay, a dry scrubbing agent, an engineered reactant, iron sponge, an ion-exchange resin, media, molecular sieve, a polymeric adsorbent, promoted alumina, a reactant, a scavenger, silica gel, a base, a neutralizing agent, a pH buffer, and a zeolite.

In embodiments, said acid removal material comprises a mixture of water and one or more bases selected from the group consisting of: a hydroxide, calcium hydroxide, sodium hydroxide, calcium oxide, sodium bicarbonate, ammonia, sodium carbonate, and potassium hydroxide. In embodiments, said acid removal material comprises a mixture of a solvent and one or more bases selected from the group consisting of: a hydroxide, calcium hydroxide, sodium hydroxide, calcium oxide, sodium bicarbonate, ammonia, sodium carbonate, and potassium hydroxide.

In embodiments, said acid removal material comprises a solvent. In embodiments, said acid removal material comprises mixture of a solvent and water. In embodiments, said acid removal material comprises a neutralizing agent. In embodiments, said neutralizing agent neutralizes the acid within the first intermediate processed gas (2G') with a neutral solution. In embodiments, said neutralizing agent comprises an inorganic compound, wherein said inorganic compound reacts with the acid to neutralize the acid. In embodiments, non-limiting examples of said neutralizing agent include one or more selected from the group consisting of a hydroxide, calcium carbonate, sodium bicarbonate, magnesium oxide, calcium oxide, sodium hydroxide, potassium hydroxide, ammonium hydroxide, sodium carbonate, and potassium carbonate. In embodiments, said acid removal material comprises a pH buffer. In embodiments, said pH buffer includes a zwitterionic buffer. In embodiments, said pH buffer includes a non-zwitterionic buffer.

FIG. 14 also shows the second stage gas processing system (2B) producing the source of the second gas (SG), which first is supplied to the intermediate processing stage (21). The second gas (SG) is discharged from a second gas outlet (SG1) of the second stage gas processing system (2B) and provided to a second gas inlet (SG2') of the intermediate processing stage (21). The second gas (SG) enters the intermediate processing stage (21), and it is then evacuated therefrom via an outlet (SG1'), where the second gas (SG) is then supplied to the second gas inlet (SG2) of the gas mixing system (3).

In embodiments, the intermediate processing stage (21) processes the first intermediate processed gas (2G') by separating volatile organic compounds from the first intermediate processed gas (2G'), wherein the second intermediate processed gas (2G") comprises a reduced amount of said volatile organic compounds relative to the first intermediate processed gas (2G'). In embodiments, the volatile organic compounds within the intermediate processing stage (21) are removed by adsorption in a plurality of plurality of vessels. In embodiments, the adsorption removal of the volatile organic compounds is a cyclic-batch operation, wherein one vessel comprising an adsorbent is on-line and processing the first intermediate processed gas (2G') by adsorbing the volatile organic compounds therefrom, when simultaneously, a second vessel (or third, or more), are off-line and are undergoing a desorption step to regenerate the adsorbent material for future use. In embodiments, the second gas (SG) is provided from the second stage gas processing system (2B) and into one or more the off-line vessels undergoing desorption and/or regeneration of the adsorbent for future use of the adsorbent to remove volatile organic compounds from the first intermediate processed gas (2G'). In embodiments, the second gas (SG) is evacuated from the intermediate processing stage (21) after it assisted in and/or performed a desorption process of the adsorbent used in separating the volatile organic compounds from the first intermediate processed gas (2G'), and the second gas (SG) is then provided to the gas mixing system (3) for recycle to another area of the gas purification system (1) (e.g.—as discharge gas (DG) to be mixed with the source of gas (0G) (via inlet DG2'); to be supplied to the pre-processing system (PRE) (via inlet DG2"); and/or to be supplied to the first stage gas processing system (2A) (via inlet DG2)).

In embodiments, the configuration shown in FIG. 14 allows for removal of the second gas (SG) from the second stage gas processing system (2B), and to use the second gas (SG) in a desorption step of a volatile organic compounds separation step of the intermediate processing stage (21), and then sending the second gas (with desorbed volatile organic compounds) to the gas mixing system (3) and then to another area of the gas purification system (1). In embodiments, the second gas (SG) transferred from the second stage gas processing system (2B) originates from a carbon dioxide separation process. In embodiments, the second gas (SG) transferred from the second stage gas processing system (2B) originates from a carbon dioxide separation process employing the use of a membrane and/or adsorption. In embodiments, the second gas (SG) transferred from the second stage gas processing system (2B) originates from a byproduct of one or more processes listed above that the second stage gas processing system (2B) performs.

In embodiments, the second gas (SG) that is evacuated from the intermediate processing stage (21) varies in pressure and/or varies in flow. In embodiments, the second gas (SG) that is evacuated from the intermediate processing stage (21) is transferred to the gas mixing system in a cyclic-batch manner since the adsorption/desorption process that it interacts with in the intermediate processing stage (21) is not continuous, but is batch, and/or a cyclic batch mode of operation. In embodiments, the second gas (SG) that is evacuated from the intermediate processing stage (21) is transferred to the gas mixing system at a pressure lower than the destination to where it is intended to be delivered to (e.g.—as discharge gas (DG) to be mixed with the source of gas (0G) (via inlet DG2'); to be supplied to the pre-processing system (PRE) (via inlet DG2"); and/or to be supplied to the first stage gas processing system (2A) (via inlet DG2)), and therefore, in the gas mixing system (3), the pressure of the second gas (SG) is boosted by use of the velocity and/or momentum of the first gas (FG) within the gas mixing system (3).

In embodiments, said second gas (SG) comprises a greater amplitude of pressure variations relative to said first gas (FG). In embodiments, said second gas (SG) comprises a greater frequency of pressure variations relative to said first gas (FG).

For example, said second gas (SG) is provided by a batch process. For example, said second gas (SG) is provided by a batch process including a cyclic-batch process. For example, said second gas (SG) is provided by a batch process which is not continuous. For example, said second gas (SG) is provided by a batch process, which is a cyclic-batch process that is integrated to continuously produce a processed gas, but provided said second gas (SG) as an output of said batch process.

In embodiments, the second gas (SG) that is evacuated from the intermediate processing stage (21) is transferred to the gas mixing system at a pressure equal to and/or greater than the destination to where it is intended to be delivered to (e.g.—as discharge gas (DG) to be mixed with the source of gas (0G) (via inlet DG2'); to be supplied to the pre-processing system (PRE) (via inlet DG2"); and/or to be supplied to the first stage gas processing system (2A) (via inlet DG2)), and therefore, in the gas mixing system (3), the pressure of the second gas (SG) does not need to be boosted by use of the velocity and/or momentum of the first gas (FG) within the gas mixing system (3). In this latter case, the first gas (FG) can be lowered, adjusted, or stopped allowing the second gas (SG) to passively flow through the gas mixing system (3) and enter its final destination.

FIG. 15

Figure 15:
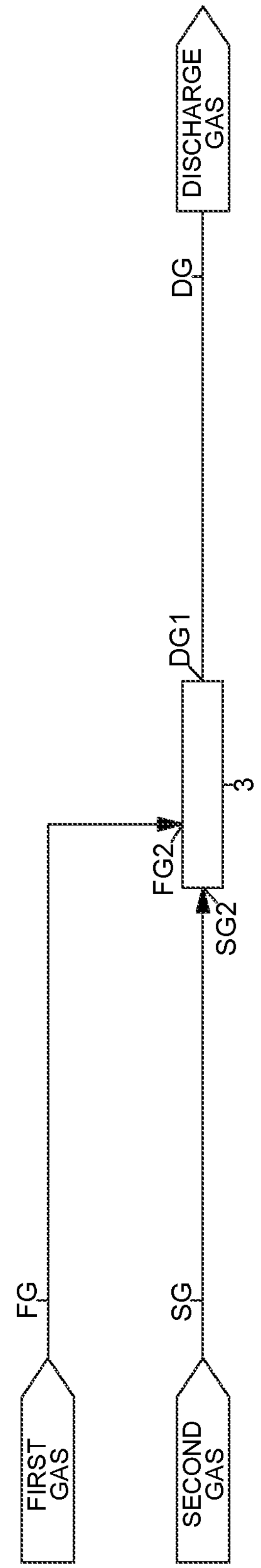
FIG. 15 depicts a non-limiting embodiment of a the gas mixing system (3) shown in any one of FIGS. 1-14, wherein the gas mixing system (3) accepts the first gas (FG) via a first gas inlet (FG2) and a second gas (SG) via a second gas inlet (SG2), and mixes the first gas (FG) with the second gas (SG) within the gas mixing system (3) and discharges a discharge gas (DG), via a discharge gas outlet (DG1).

FIG. 15 depicts a non-limiting embodiment of a the gas mixing system (3) shown in any one of FIGS. 1-14, wherein the gas mixing system (3) accepts the first gas (FG) via a first gas inlet (FG2) and a second gas (SG) via a second gas inlet (SG2), and mixes the first gas (FG) with the second gas (SG) within the gas mixing system (3) and discharges a discharge gas (DG), via a discharge gas outlet (DG1).

FIG. 16

Figure 16:
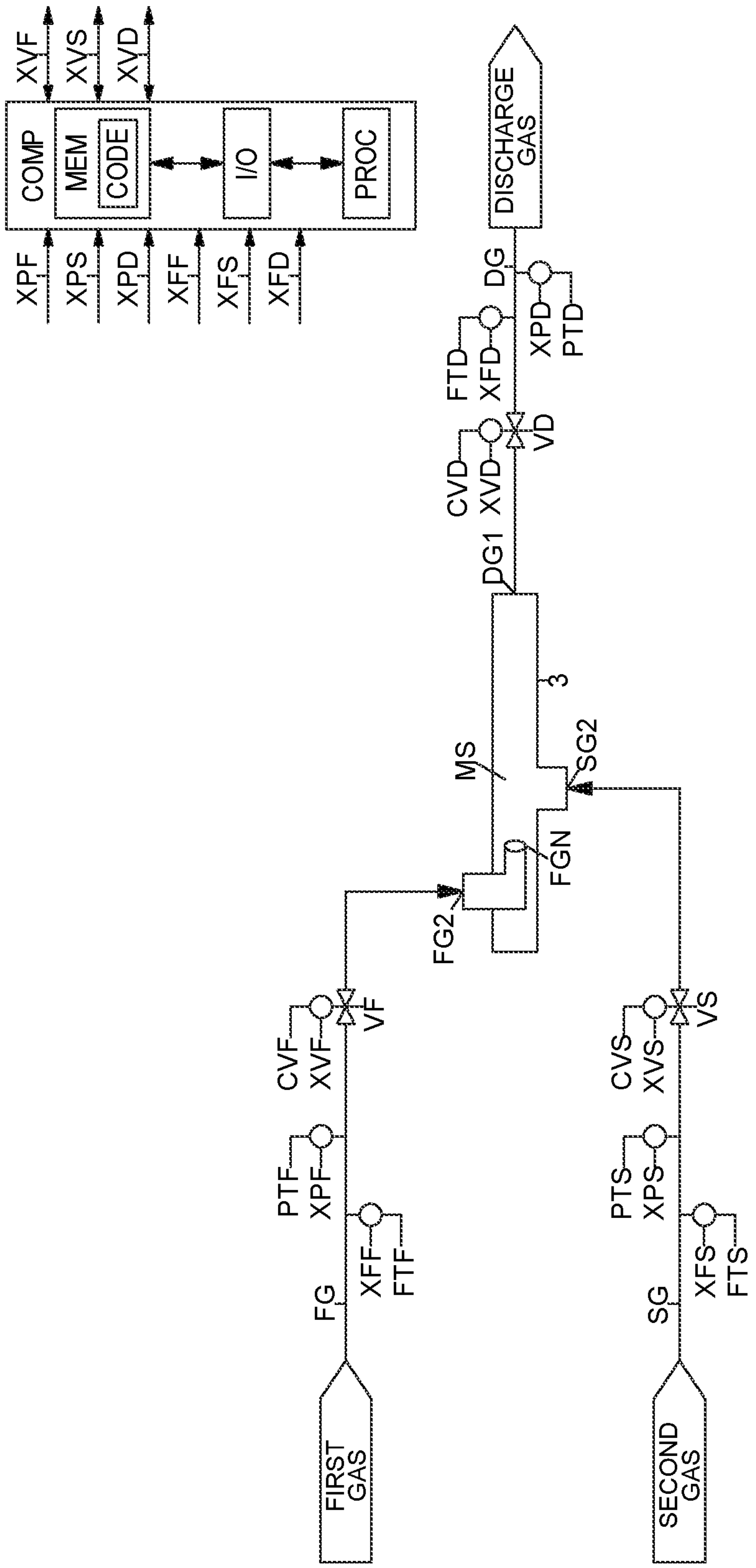
FIG. 16 depicts a non-limiting embodiment of the gas mixing system (3) shown in any one of FIGS. 1-15, wherein the gas mixing system (3) further comprises a first control valve (VF), a second control valve (VS), and a third control valve (VD) to regulate flow of the first gas (FG), the second gas (SG), and the discharge gas (DG), respectively.

FIG. 16 depicts a non-limiting embodiment of the gas mixing system (3) shown in any one of FIGS. 1-15, wherein the gas mixing system (3) further comprises a first control valve (VF), a second control valve (VS), and a third control valve (VD) to regulate flow of the first gas (FG), and the second gas (SG), and/or the discharge gas (DG), respectively.

FIG. 16 elaborates upon the gas mixing system (3) according to FIG. 15. A first control valve (VF) is provided to regulate the flow of the first gas (FG) that is provided to the first gas inlet (FG2) of the gas mixing system (3). The first control valve (VF) is equipped with a controller (CVF) which sends and receives a signal (XVF) to a computer (COMP). A first flow sensor (FTF) is provided to measure the flow of the first gas (FG) that is provided to the first gas inlet (FG2) of the gas mixing system (3). The first flow sensor (FTF) is equipped to send a signal (XFF) to the computer (COMP). A first pressure sensor (PTF) is provided to measure the pressure of the first gas (FG) that is provided to the first gas inlet (FG2) of the gas mixing system (3). The first pressure sensor (PTF) is equipped to send a pressure signal (XPF) to the computer (COMP).

A second control valve (VS) is provided to regulate the flow of the second gas (SG) that is provided to the second gas inlet (SG2) of the gas mixing system (3). The second control valve (VS) is equipped with a controller (CVS) which sends and receives a signal (XVS) to a computer (COMP). A second flow sensor (FTS) is provided to measure the flow of the second gas (SG) that is provided to the second gas inlet (SG2) of the gas mixing system (3). The second flow sensor (FTS) is equipped to send a signal (XFS) to the computer (COMP). A second pressure sensor (PTS) is provided to measure the pressure of the second gas (SG) that is provided to the second gas inlet (SG2) of the gas mixing system (3). The second pressure sensor (PTS) is equipped to send a pressure signal (XPS) to the computer (COMP).

In embodiments, the first gas (FG) is introduced to the interior of the gas mixing system (3) where the first gas (FG) mixes with the second gas (SG) within a mixing section (MS) of the interior of the gas mixing system (3). A discharge gas (DG), is discharged from the discharge gas outlet (DG1) of the gas mixing system (3).

A third control valve (VD) is provided to regulate the flow of the discharge gas (DG) that is evacuated from the discharge gas outlet (DG1) of the gas mixing system (3). The third control valve (VD) is equipped with a controller (CVD) which sends and receives a signal (XVD) to a computer (COMP). A third flow sensor (FTD) is provided to measure the flow of the discharge gas (DG) that is evacuated from the discharge gas outlet (DG1) of the gas mixing system (3). The third flow sensor (FTD) is equipped to send a signal (XFD) to the computer (COMP). A third pressure sensor (PTD) is provided to measure the pressure of the discharge gas (DG) that is evacuated from the discharge gas outlet (DG1) of the gas mixing system (3). The third pressure sensor (PTD) is equipped to send a pressure signal (XPD) to the computer (COMP).

Figure 17:
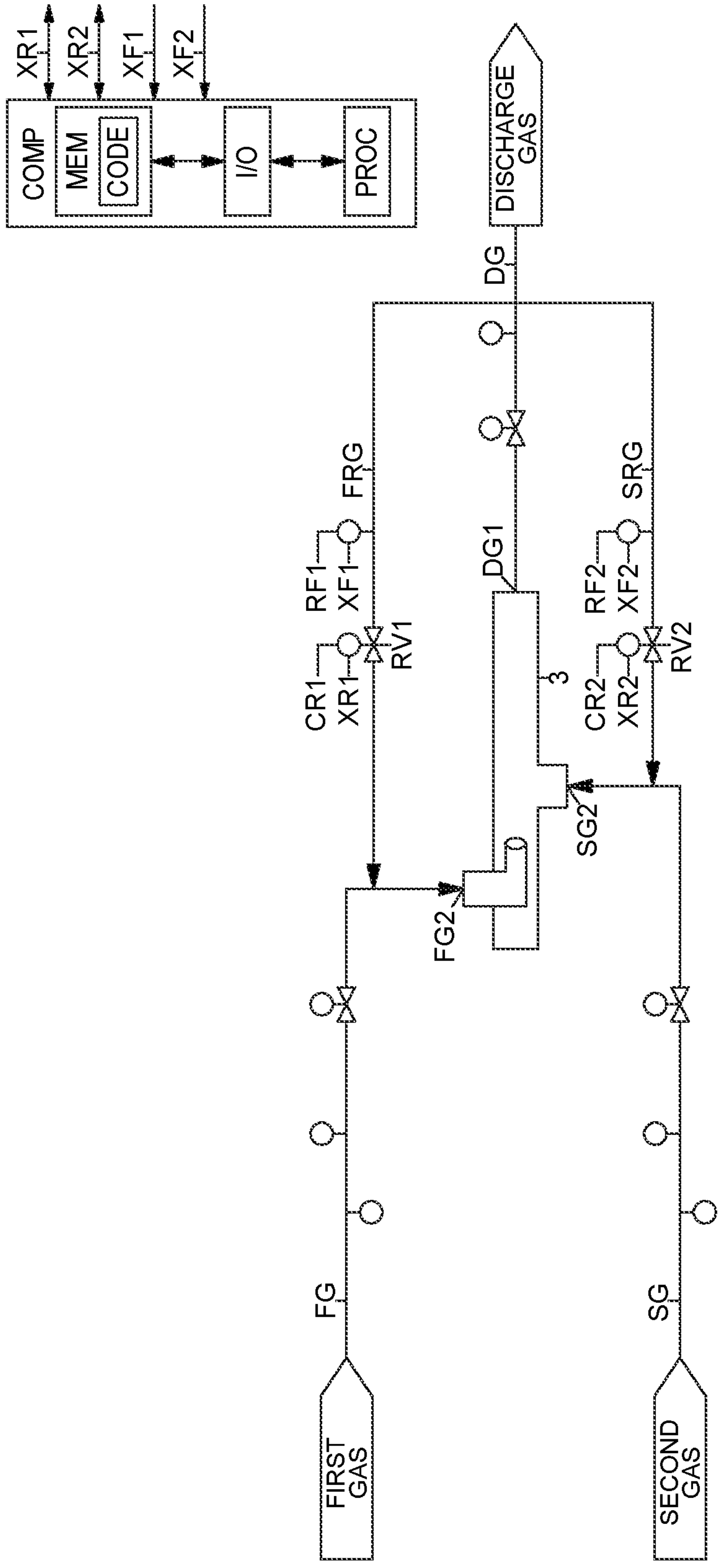
FIG. 17 depicts a non-limiting embodiment of the gas mixing system (3) shown in FIG. 16, wherein the gas mixing system (3) further comprises a first recycle control valve (RV1) and a second recycle control valve (RV2) for recycling a portion of the discharge gas (DG) to be mixed with the first gas (FG), and the second gas (SG), respectively.

In embodiments, the signals from controllers or sensors are inputted or outputted to and from a computer (COMP) by a user or operator via an input/output interface (I/O) as disclosed in FIGS. 16 and 17. Program and sequencing instructions may be executed to perform particular computational functions such as automated operation of the valves (VF, VS, VD, RV1, RV2), actuators to said valves, controllers to said valves, and any relevant processing equipment and/or instrumentation associated with any asset described herein, not only including in the aforesaid gas purification system (1), pre-processing system (PRE), gas processing system (2), gas mixing system (3), and/or post-processing system (POST).

In embodiments, an intermediate of operation in between said first mode of operation and said second mode of operation, said first control valve (VF) is open and said second control valve (VS) is closed. In embodiments, in said first mode of operation, in said second mode of operation, and in said intermediate mode of operation, said predetermined third flow of said discharge gas (DG) are identical. In embodiments, in said first mode of operation, in said second mode of operation, and in said intermediate mode of operation, said predetermined third flow of said discharge gas (DG) are not identical.

In embodiments, a computer (COMP) includes a processor (PROC) coupled to a system memory (MEM) via an input/output interface (I/O). The processor (PROC) may be any suitable processor capable of executing instructions. System memory (MEM) may be configured to store instructions and data accessible by processor (PROC). In various embodiments, system memory (MEM) may be implemented using any suitable memory technology. In the illustrated non-limiting embodiments of FIGS. 16 to 24, program instructions and data implementing desired functions are shown stored within system memory (MEM) as code (CODE). In embodiments, the I/O interface (I/O) may be configured to coordinate I/O traffic between processor (PROC) and system memory (MEM).

In some embodiments, the I/O interface (I/O) is configured for a user or operator to input necessary sequencing protocol into the computer (COMP) for process execution, including sequence timing and repetition of a given number of states to realize a desired sequence of steps and/or states. In embodiments, the signals operatively coupled to a controller, valve, actuator, or the like, may be an input value to be entered into the computer (COMP) by the I/O interface (I/O).

The system is fully flexible to be tuned, configured, and optimized to provide an environment for scheduling the appropriate process parameters by programmatically controlling the opening and closing of valves at specific time intervals, or strategically and systematically opening, closing, turning on, turning off, modulating, controlling, or operating motors, valves, or actuators at specific time intervals at specific times.

In embodiments, a user or operator may define control loops, cycle times, step numbers, and states which may be programmed into the computer (COMP) by an operator accessible input/output interface (I/O). In some embodiments, the functional controls of the system, as disclosed herein, solve numerous technical challenges associated with consistently realizing a predictable and reliable operation of the gas purification system (1), pre-processing system (PRE), gas processing system (2), gas mixing system (3), and/or post-processing system (POST).

In embodiments, the gas mixing system (3) according to FIG. 16 operates in a plurality of modes of operations. In a first mode of operation, the first gas (FG) includes a first pressure, and the second gas (SG) includes a second pressure, wherein the first pressure is greater than the second pressure, whereby the first gas (FG) pulls a vacuum on the second gas (SG) to produce a discharge gas (DG), wherein the discharge gas (DG) has a pressure greater than the second pressure and lesser than the first pressure and/or the third pressure has a pressure greater than a required pressure needed to supply the discharge gas (DG) into a pressure of a gas processing system, where the discharge gas (DG) is then processed.

In a second mode of operation, the second pressure is greater than the pressure of the gas processing system, where the second gas (SG) is then processed; wherein in the second mode of operation, the flow rate of the first gas (FG) is lesser than the flow rate of the first gas (FG) in the first mode of operation.

FIG. 16 describes a method comprising:

A method of producing a biogas-related product, the method comprises:

- providing a gas mixing system (3), said gas mixing system is configured to operate in a plurality of modes of operation: said gas mixing system comprises:
- a first gas inlet (FG2) configured to accept a first gas (FG);
- a second gas inlet (SG2) configured to accept a second gas (SG); and a discharge gas outlet (DG1) configured to discharge a discharge gas (DG), from said gas mixing system (3); wherein:

in a first mode of operation, said first gas (FG) is supplied to said gas mixing system (3) through said first gas inlet (FG2), said first gas (FG) includes a first pressure and a first flow rate;

and said second gas (SG) is supplied to said gas mixing system (3) through said second gas inlet (SG2), wherein said second gas (SG) includes a second pressure and a second flow rate; wherein in said first mode of operation, said first pressure is greater than said second pressure and said first gas (FG) pulls a vacuum on said second gas (SG) to mix said first gas (FG) with said second gas (SG) to produce a discharge gas (DG), comprising a mixture of said first gas (FG) and said second gas (DG); wherein said discharge gas (DG) comprises a third pressure greater than the second pressure and lesser than said first pressure;

in a second mode of operation, said second flow rate is greater than said the first flow rate, and said first flow rate is lesser than said first flow rate of said first gas (FG) in said first mode of operation; and:

one or more selected from the group consisting of:

said first gas (FG) is derived from a source of biogas;

said second gas is derived from said source of biogas; and and said third pressure has a pressure greater than a fourth pressure that is needed to supply said discharge gas (DG) into said fourth pressure within a gas processing system, wherein said discharge gas (DG) is then supplied to said gas processing system and processing into either said first gas and said second gas.

FIG. 17

FIG. 17 depicts a non-limiting embodiment of the gas mixing system (3) shown in FIG. 16, wherein the gas mixing system (3) further comprises a first recycle control valve (RV1) and a second recycle control valve (RV2) for recycling a portion of the discharge gas (DG) to be mixed with the first gas (FG), and the second gas (SG), respectively.

FIG. 17 shows a portion of the discharge gas (DG) that can be recycled to with either the first gas (FG) and/or second gas (SG). A first recycle gas (FRG), which includes a portion of the gas discharged from the gas mixing system (3) is configured to be mixed with the first gas (FG).

A first recycle control valve (RV1) is provided to regulate the flow of the first recycle gas (FRG) that is provided to the first gas inlet (FG2) of the gas mixing system (3). The first recycle control valve (RV1) is equipped with a controller (CR1) which sends and receives a signal (XR1) to a computer (COMP). A first recycle flow sensor (RF1) is provided to measure the flow of the first recycle gas (FRG) that is provided to the first gas inlet (FG2) of the gas mixing system (3).

A second recycle control valve (RV2) is provided to regulate the flow of the second recycle gas (SRG) that is provided to the second gas inlet (SG2) of the gas mixing system (3). The second recycle control valve (RV2) is equipped with a controller (CR2) which sends and receives a signal (XR2) to a computer (COMP). A second recycle flow sensor (RF2) is provided to measure the flow of the second recycle gas (SRG) that is provided to the second gas inlet (SG2) of the gas mixing system (3).

FIG. 18

Figure 18:
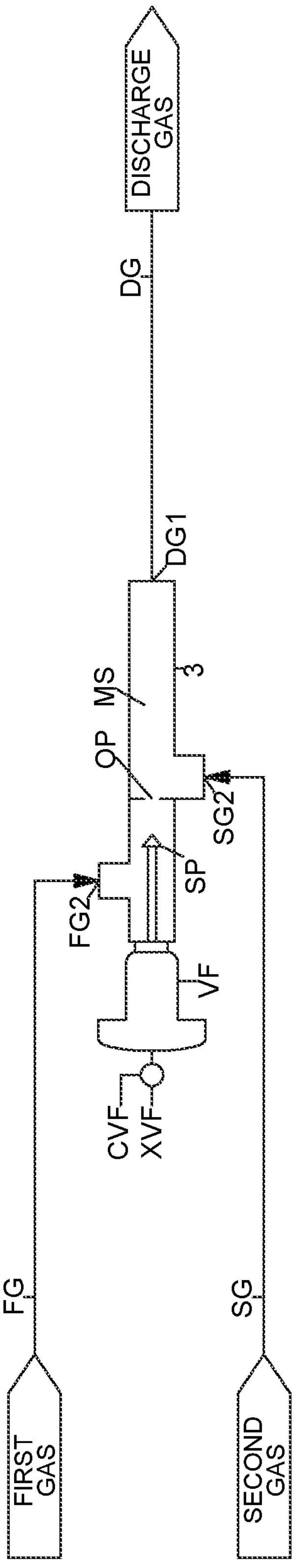
FIG. 18 depicts a non-limiting embodiment of a the gas mixing system (3) shown in any one of FIGS. 1-17, wherein the gas mixing system (3) further comprises the first control valve (VF), to regulate flow of the first gas (FG), wherein the first control valve (VF) is mounted to and operationally integrated with the gas mixing system (3)

FIG. 18 depicts a non-limiting embodiment of a the gas mixing system (3) shown in any one of FIGS. 1-17, wherein the gas mixing system (3) further comprises the first control valve (VF), to regulate flow of the first gas (FG), wherein the first control valve (VF) is mounted to and operationally integrated with the gas mixing system (3), and FIG. 18 shows a first state of operation wherein the first gas (FG) passes through the gas mixing system (3).

Figure 19:
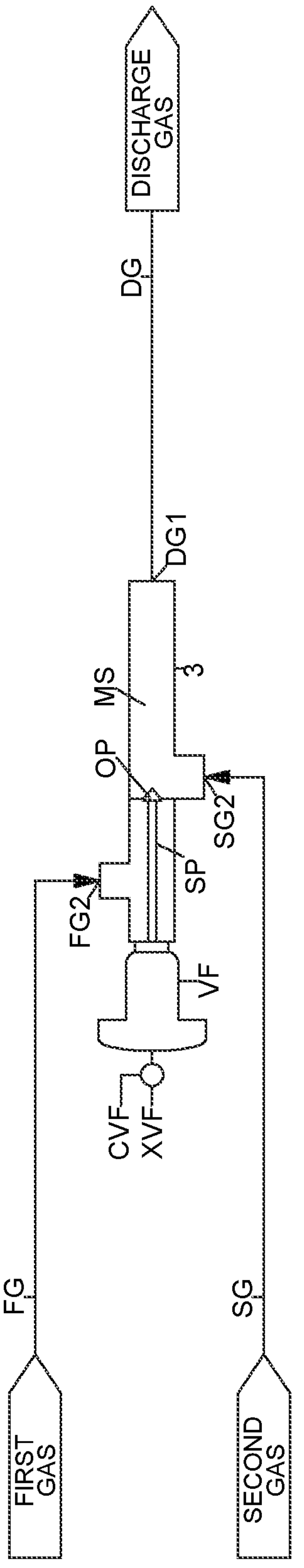
FIG. 19 depicts a non-limiting embodiment of a the gas mixing system (3) shown in FIG. 18, wherein the gas mixing system (3) further comprises a first control valve (VF), to regulate flow of the first gas (FG), wherein the first control valve (VF) is mounted to and operationally integrated with the gas mixing system (3)

FIGS. 18 and 19 both show the first control valve (CVF) operably mounted to the gas mixing system (3), to allow the first gas (FG) to be regulated into the first gas inlet (FG2). In embodiments, the first control valve (VF) has an automatically-controlled spindle (SP) to permit the sealing surface of the spindle (SP) to come into contact with an opening (OP) in the gas mixing system (3) to allow or to prevent flow of the first gas (FG) from passing through the opening (OP) and for the first gas (FG) to mix with the second gas (SG) in the mixing section (MS) of the gas mixing system (3).

In embodiments, the gas mixing system (3) shown in FIGS. 18 and 19 include a thermocompressor with an automatically-controlled spindle. In embodiments, the gas mixing system shown in FIGS. 18 and 19 includes a type of ejector comprising a thermocompressor with an automatically-controlled spindle. In embodiments, the gas mixing system shown in FIGS. 18 and 19 include jet compressor, an ejector, an eductor, venturi jet pump, eductor-jet pump, and/or a thermocompressor.

Ideally, the gas mixing system (3) is used when the pressure and/or flow of the first gas (FG) and second gas (SG) vary and use of the gas mixing system (3) shown herein permit accurate and reliable control of the pressures and flows of the first gas (FG) and second gas (SG). The spindle (SP) as shown in FIGS. 18 and 19 allow for a means of tight shut-off of the first gas (FG) when only the second gas (SG) is flowing through the gas mixing system (3). In embodiments, the gas mixing system (3) described herein comprises a device to increase the pressure of the second gas (SG) to a relatively higher pressure for reuse in the gas purification system (1), by using the momentum of the first gas (FG).

FIG. 19

FIG. 19 depicts a non-limiting embodiment of a the gas mixing system (3) shown in FIG. 18, wherein the gas mixing system (3) further comprises a first control valve (VF), to regulate flow of the first gas (FG), wherein the first control valve (VF) is mounted to and operationally integrated with the gas mixing system (3), and FIG. 19 shows a second state of operation wherein the first gas (FG) does not pass through the gas mixing system (3).

In embodiments, FIG. 19 shows a second state of operation wherein a relatively lesser flow of the first gas (FG) passes through the gas mixing system (3) relative to the first state of operation. In embodiments, FIG. 19 merely shows that the spindle (SP) allows for a means of tight shut-off of the first gas (FG) when only the second gas (SG) is flowing through the gas mixing system (3). However, it is to be noted that FIG. 19 is non-limiting and that in some embodiments, a flow of the first gas (FG) in fact does flow through the opening (OP) in the gas mixing system (3) to allow the first gas (FG) to pass through the opening (OP) and for the first gas (FG) to mix with the second gas (SG) in the mixing section (MS) of the gas mixing system (3).

FIG. 20

Figure 20:
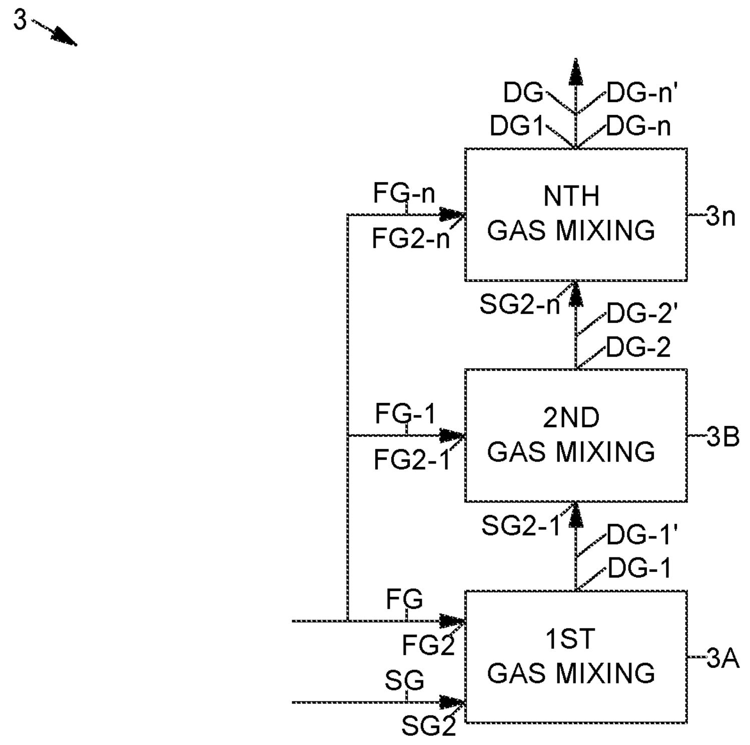
FIG. 20 depicts a non-limiting embodiment wherein the gas mixing system (3) comprises a plurality of gas mixing system (3) in series.

FIG. 20 depicts a non-limiting embodiment wherein the gas mixing system (3) comprises a plurality of gas mixing system (3) in series.

The non-limiting embodiment of FIG. 20 depicts a plurality of gas mixing systems (3A, 3B, 3*n*), that may be applicable to any Figure in this specification where a gas mixing system (3) is used and/or described, not only including FIGS. 1-26.

The gas mixing system of FIG. 20 includes: a first gas mixing system (3A), a second gas mixing system (3B), and a nth gas mixing system (3*n*). FIG. 20 shows three gas mixing systems (3A, 3B, 3*n*) however it is noted that the nth gas mixing system (3*n*) could be the third, fourth, fifth, or more gas mixing systems. FIG. 20 shows the first gas mixing system (3A) configured to accept the first gas (FG) and the second gas (SG) from any combination and/or permutation from the gas purification system (1) and/or from a system that provides a gas that includes a biogas, a biogas-derived gas, and a first gas (FG) or second gas (SG) that is not necessarily derived in its entirety or at all from a source of biogas as described above in detail.

In embodiments, the first gas (FG) is supplied to the first gas mixing system (3A) via the first gas inlet (FG2). Further, FIG. 20 shows the first gas (FG-1) is also supplied to the second gas mixing system (3B) (via a first gas inlet (FG2-1)), and the first gas (FG-n) is supplied to the nth gas mixing system (3*n*) (via a first gas inlet (FG2-*n*)). FIG. 20 shows the second gas (SG) supplied to the first gas mixing system (3A) via the second gas inlet (SG2). The first gas (FG) and the second gas (SG) mix within the first gas mixing system (3A) to produce a first discharge gas (DG-1') that is evacuated from the first gas mixing system (3A) via a first discharge gas outlet (DG-1). The first discharge gas (DG-1') is supplied from the first discharge gas outlet (DG-1) of the first gas mixing system (3A) to a first discharge gas inlet (SG2-1) of the second gas mixing system (3B). In embodiments, the first discharge gas (DG-1') includes a mixture of the first gas (FG) and the second gas (SG) which is provided to the second gas mixing system (3B) to be mixed with the first gas (FG-1). In embodiments, the first discharge gas (DG-1') acts as the second gas (SG) within the second gas mixing system (3B) and mixes with the first gas (FG-1).

The first gas (FG-1) and the first discharge gas (DG-1') mix within the second gas mixing system (3B) to produce a second discharge gas (DG-2') that is evacuated from the second gas mixing system (3B) via a second discharge gas outlet (DG-2). The second discharge gas (DG-2') is supplied from the second discharge gas outlet (DG-2) of the second gas mixing system (3B) to a second discharge gas inlet (SG2-*n*) of the nth gas mixing system (3*n*). In embodiments, the second discharge gas (DG-2') is supplied from the second discharge gas outlet (DG-2) of the second gas mixing system (3B) to a second discharge gas inlet (SG2-*n*) of the nth (or third as shown) gas mixing system (3*n*). In embodiments, the second discharge gas (DG-2') acts as the second gas (SG) within the nth gas mixing system (3*n*) and mixes with the first gas (FG-n).

The first gas (FG-n) and the second discharge gas (DG-2') mix within the nth gas mixing system (3*n*) to produce an nth (or third as shown) discharge gas (DG-n') that is evacuated from the nth (or third as shown) gas mixing system (3*n*) via an nth (e.g.—a third as shown) discharge gas outlet (DG-n). In embodiments, the nth discharge gas outlet (DG-n) comprises the discharge gas outlet (DG1) as described in other Figures. In embodiments, the nth discharge gas (DG-n') comprises the discharge gas (DG) as described in other Figures. In embodiments, the nth discharge gas (DG-n') comprises the discharge gas (DG) as described in other Figures. In embodiments, the discharge gas (DG) comprises the nth discharge gas (DG-n'). In embodiments, the nth discharge gas (DG-n') (e.g.—the discharge gas (DG), and/or the nth discharge gas (DG-n')) can be supplied to any and all locations as described in this patent specification as disclosed in the accompanied Figures.

Figure 21:
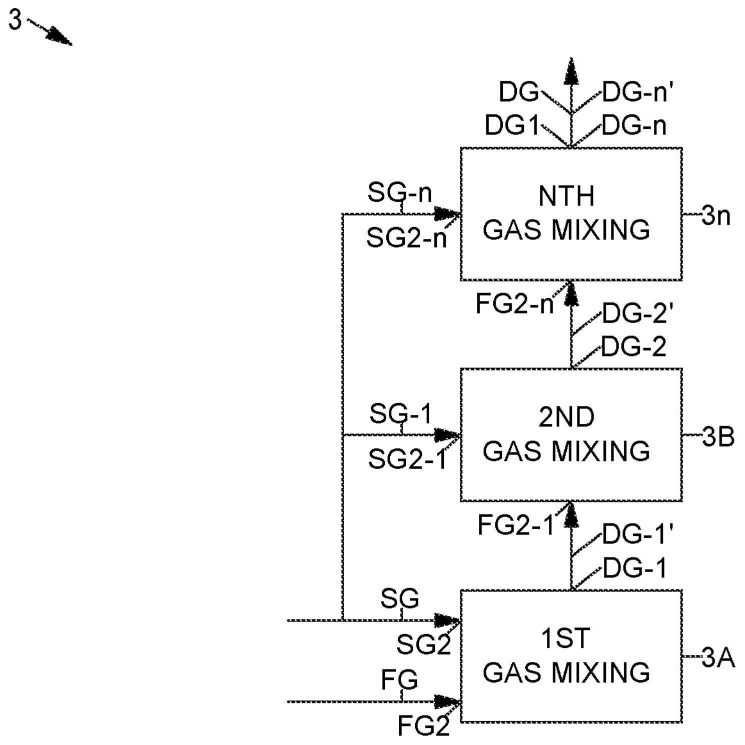
FIG. 21 depicts a non-limiting embodiment wherein the gas mixing system (3) comprises a plurality of gas mixing system (3) in series.

There are many benefits of using gas mixing systems (3A, 3B, 3*n*) in series as shown in FIGS. 20 and 21, not only including increased energy efficiency, improved suction performance, increased flexibility, greater turn-down, and increased reliability. For example, the use of several gas mixing systems in series can result in improved suction performance on the second gas (SG) by affording the ability to transfer greater volumes of relatively lower pressure second gas (SG). For example, use of multipole gas mixing systems in series can result in the first discharge gas (DG-1') evacuated from any combination and/or permutation from the gas purification system (1) and/or from a system that provides a gas that includes a biogas, a biogas-derived gas, and a first gas (FG) or second gas (SG) that is not necessarily derived in its entirety or at all from a source of biogas as described above in detail.

FIG. 21

FIG. 21 depicts a non-limiting embodiment wherein the gas mixing system (3) comprises a plurality of gas mixing system (3) in series.

The non-limiting embodiment of FIG. 21 depicts a plurality of gas mixing systems (3A, 3B, 3*n*), that may be applicable to any Figure in this specification where a gas mixing system (3) is used and/or described, not only including FIGS. 1-26. The gas mixing system of FIG. 21 includes: a first gas mixing system (3A), a second gas mixing system (3B), and a nth gas mixing system (3*n*). FIG. 21 shows three gas mixing systems (3A, 3B, 3*n*) however it is noted that the nth gas mixing system (3*n*) could be the third, fourth, fifth, or more gas mixing systems.

FIG. 21 shows the first gas mixing system (3A) configured to accept the first gas (FG) and the second gas (SG) from any combination and/or permutation from the gas purification system (1) and/or from a system that provides a gas that includes a biogas, a biogas-derived gas, and a first gas (FG) or second gas (SG) that is not necessarily derived in its entirety or at all from a source of biogas as described above in detail. In embodiments, the first gas (FG) is supplied to the first gas mixing system (3A) via the first gas inlet (FG2). FIG. 21 also shows the second gas (SG) supplied to the first gas mixing system (3A) via the second gas inlet (SG2).

Further, FIG. 21 shows the second gas (SG-1) is also supplied to the second gas mixing system (3B) (via a second gas inlet (SG2-1)), and the second gas (SG-n) to the nth gas mixing system (3*n*) (via a second gas inlet (SG2-*n*)). The first gas (FG) and the second gas (SG) mix within the first gas mixing system (3A) to produce a first discharge gas (DG-1') that is evacuated from the first gas mixing system (3A) via a first discharge gas outlet (DG-1). The first discharge gas (DG-1') is supplied from the first discharge gas outlet (DG-1) of the first gas mixing system (3A) to a first discharge gas inlet (FG2-1) of the second gas mixing system (3B). In embodiments, the first discharge gas (DG-1') includes a mixture of the first gas (FG) and the second gas (SG) which is provided to the second gas mixing system (3B) to be mixed with the second gas (SG-1). In embodiments, the first discharge gas (DG-1') acts as the first gas (FG) within the second gas mixing system (3, 3B) and mixes with the second gas (SG-1).

The second gas (SG-1) and the first discharge gas (DG-1') mix within the second gas mixing system (3B) to produce a second discharge gas (DG-2') that is evacuated from the second gas mixing system (3B) via a second discharge gas outlet (DG-2). The second discharge gas (DG-2') is supplied from the second discharge gas outlet (DG-2) of the second gas mixing system (3B) to a second discharge gas inlet (FG2-*n*) of the nth gas mixing system (3*n*). In embodiments, the second discharge gas (DG-2') is supplied from the second discharge gas outlet (DG-2) of the second gas mixing system (3B) to a second discharge gas inlet (FG2-*n*) of the nth (e.g.—the third as shown) gas mixing system (3*n*). In embodiments, the second discharge gas (DG-2') acts as the first gas (FG) within the nth gas mixing system 3*n*) and mixes with the second gas (SG-n).

The second gas (SG-n) and the second discharge gas (DG-2') mix within the nth gas mixing system (3*n*) to produce a nth (or third as shown) discharge gas (DG-n') that is evacuated from the nth (or third as shown) gas mixing system (3*n*) via an nth (or third as shown) discharge gas outlet (DG-n). In embodiments, the nth discharge gas outlet (DG-n) comprises the discharge gas outlet (DG1) as described in other Figures. In embodiments, the nth discharge gas (DG-n') comprises the discharge gas (DG) as described in other Figures. In embodiments, the nth discharge gas (DG-n') comprises the discharge gas (DG) as described in other Figures. In embodiments, the discharge gas (DG) comprises the nth discharge gas (DG-n'). In embodiments, the nth discharge gas (DG-n') (e.g.—the discharge gas (DG), and/or the nth discharge gas (DG-n')) can be supplied to any and all locations as described in this patent specification as disclosed in the accompanied Figures.

FIG. 22

Figure 22:
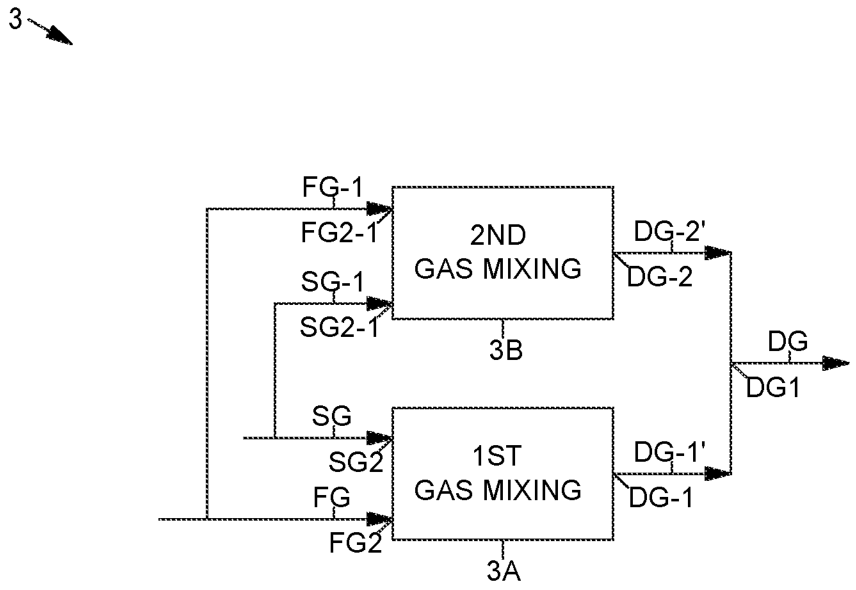
FIG. 22 depicts a non-limiting embodiment wherein the gas mixing system (3) comprises a plurality of gas mixing system (3) in parallel.

FIG. 22 depicts a non-limiting embodiment wherein the gas mixing system (3) comprises a plurality of gas mixing system (3) in parallel.

The non-limiting embodiment of FIG. 22 depicts a plurality of gas mixing systems (3A, 3B), that may be applicable to any Figure in this specification where a gas mixing system (3) is used and/or described, not only including FIGS. 1-26.

The gas mixing system of FIG. 22 includes: a first gas mixing system (3A) and a second gas mixing system (3B). It should be apparent that although two gas mixing systems (3A, 3B) are shown in FIG. 22, a plurality of gas mixing systems (3A, 3B, 3*n*) can be utilized to include three, four, five, or more gas mixing systems.

FIG. 22 shows the first gas mixing system (3A) configured to accept the first gas (FG) and the second gas (SG) from any combination and/or permutation from the gas purification system (1) and/or from a system that provides a gas that includes a biogas, a biogas-derived gas, and a first gas (FG) or second gas (SG) that is not necessarily derived in its entirety or at all from a source of biogas as described above in detail.

FIG. 22 also shows the second gas mixing system (3B) configured to accept the first gas (FG-1) and the second gas (SG-1) from any combination and/or permutation from the gas purification system (1) and/or from a system that provides a gas that includes a biogas, a biogas-derived gas, and a first gas (FG-1) or second gas (SG-1) that is not necessarily derived in its entirety or at all from a source of biogas as described above in detail.

In embodiments, the first gas (FG) supplied to the first gas mixing system (3A) may originate from any combination and/or permutation from the gas purification system (1) and/or from a system that provides a gas that includes a biogas, a biogas-derived gas, that is not necessarily derived in its entirety or at all from a source of biogas as described above in detail. In embodiments, the first gas (FG-1) supplied to the second gas mixing system (3B) may originate from any combination and/or permutation from the gas purification system (1) and/or from a system that provides a gas that includes a biogas, a biogas-derived gas, that is not necessarily derived in its entirety or at all from a source of biogas as described above in detail.

In embodiments, the second gas (SG) supplied to the second gas mixing system (3B) may originate from any combination and/or permutation from the gas purification system (1) and/or from a system that provides a gas that includes a biogas, a biogas-derived gas, that is not necessarily derived in its entirety or at all from a source of biogas as described above in detail. In embodiments, the second gas (SG-1) supplied to the second gas mixing system (3B) may originate from any combination and/or permutation from the gas purification system (1) and/or from a system that provides a gas that includes a biogas, a biogas-derived gas, that is not necessarily derived in its entirety or at all from a source of biogas as described above in detail.

In embodiments, the first gas (FG) is supplied to the first gas mixing system (3A) via the first gas inlet (FG2). FIG. 22 also shows the second gas (SG) supplied to the first gas mixing system (3A) via the second gas inlet (SG2). In embodiments, the first gas (FG-1) is supplied to the second gas mixing system (3B) via the first gas inlet (FG2-1). FIG. 22 also shows the second gas (SG-1) supplied to the second gas mixing system (3B) via the second gas inlet (SG2-1).

In embodiments, the first gas (FG) and the second gas (SG) mix within the first gas mixing system (3A) to produce a first discharge gas (DG-1') that is evacuated from the first gas mixing system (3A) via a first discharge gas outlet (DG-1). In embodiments, the first gas (FG-1) and the second gas (SG-1) mix within the second gas mixing system (3B) to produce a second discharge gas (DG-2') that is evacuated from the second gas mixing system (3B) via a second discharge gas outlet (DG-2).

In embodiments, the first discharge gas (DG-1') is then combined with the second discharge gas (DG-2') at outlet (DG1) where they form a combined discharge gas. In embodiments, the nth discharge gas (DG-n') (e.g.—the nth discharge gas (DG-n'), and/or the discharge gas (DG)) can be supplied to any and all locations as described in this patent specification as disclosed in the accompanied Figures.

In embodiments, the flow rate of the first gas (FG) supplied to the first gas mixing system (3A) is greater than the flow rate of the first gas (FG-1) supplied to the second as mixing system (3B). In embodiments, the flow rate of the second gas (SG) supplied to the first gas mixing system (3A) is greater than the flow rate of the second gas (SG-1) supplied to the second as mixing system (3B). In embodiments, the flow rate of the first discharge gas (DG-1') evacuated from the first gas mixing system (3A) is greater than the flow rate of the second discharge gas (DG-2') evacuated from the second gas mixing system (3B).

There are many benefits of using gas mixing systems (3A, 3B, 3*n*) in parallel as shown in FIG. 22, not only including increased energy efficiency, improved suction performance, increased flexibility, greater turn-down, and increased reliability. For example, the use of several gas mixing systems in parallel can result in improved suction performance on the second gas (SG) by affording the ability to transfer greater volumes of relatively lower pressure second gas (SG). For example, use of multipole gas mixing systems in series can result in the discharge gas (DG) evacuated from any combination and/or permutation from the gas purification system (1) and/or from a system that provides a gas that includes a biogas, a biogas-derived gas, and a first gas (FG) or second gas (SG) that is not necessarily derived in its entirety or at all from a source of biogas as described above in detail.

Further, the parallel gas mixing system embodiment shown in FIG. 22 also afford for improved performance under conditions with varying flow rates and pressures. For example, the first gas mixing system (3A) may have a relatively greater capacity and throughput compared to and in relation to the second gas mixing system (3B). Also, the plurality of gas mixing systems (3A, 3B) as shown in FIG. 22 allow for greater system flexibility by allowing for redundant equipment and assets to allow for maintenance and to accept varying flow demands. It should be noted that the gas mixing systems shown in series in FIGS. 20 and 21 may also be combined with the parallel configuration of FIG. 22 for increased system flexibility, turndown, and improved suction and energy efficiency. For example, the gas mixing systems (3A, 3B, 3*n*) shown in FIGS. 21 and 22 can incorporate parallel gas mixing systems in each series-system.

FIG. 23

Figure 23:
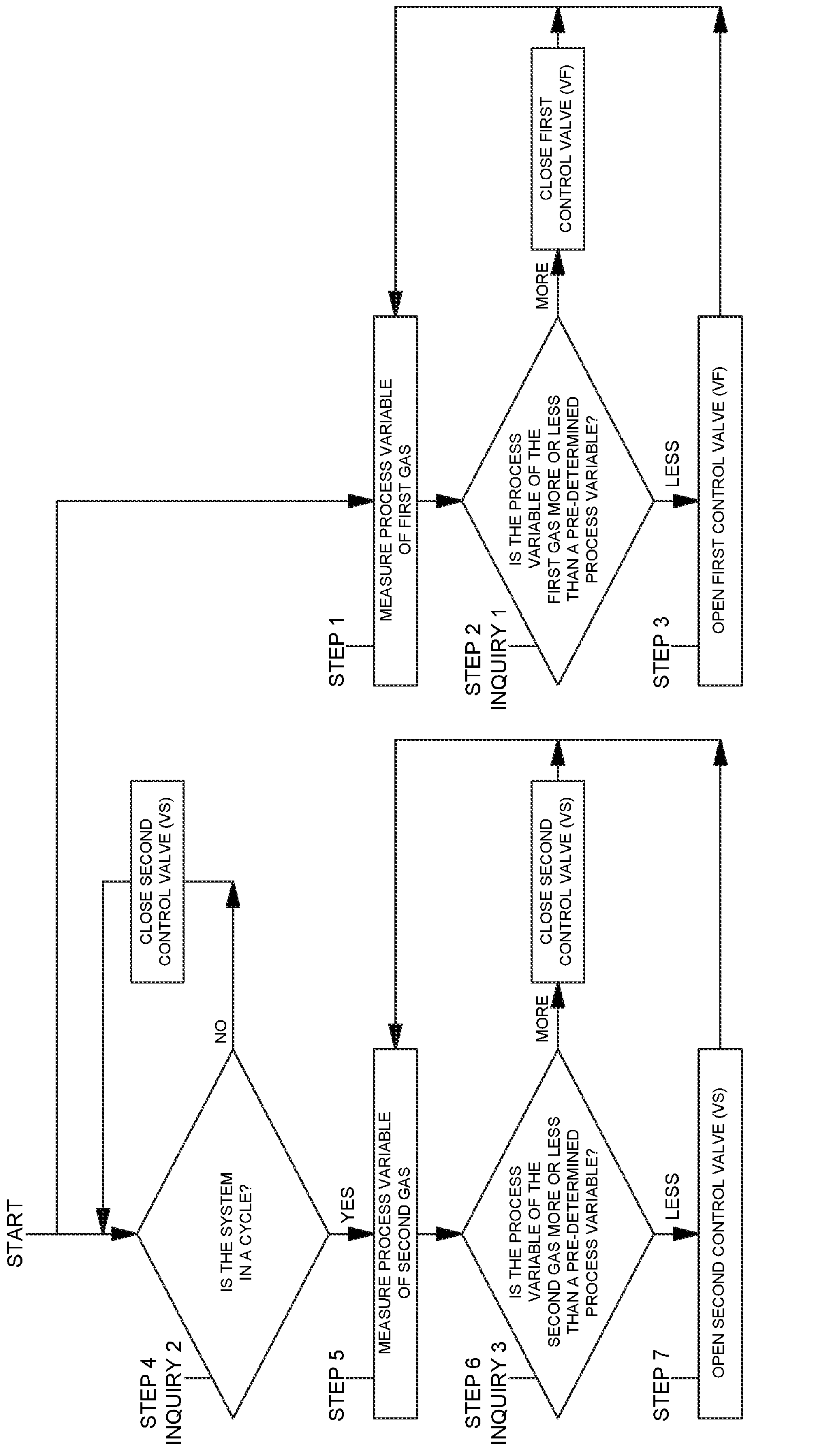
FIG. 23 shows a non-limiting embodiment of a gas mixing method.

FIG. 23 shows a non-limiting embodiment of a gas mixing method. Step 1: includes measuring the process variable of the first gas (FG); Step 2, Inquiry 1: asks is the process variable of the first gas more or less than a pre-determined process variable? If more, then close the first control valve (VF); If less, go to Step 3: and open the first control valve (VF), then go back to Step 1 to measure the process variable of the first gas. In embodiments, the process variable includes a temperature, pressure, flowrate, density, pH, viscosity, or chemical composition.

In embodiments, the first gas (FG) passes through the gas mixing system (3). While the first gas (FG) is passing through the mixing system (3), at this point the gas mixing system may not be in an automatic cycle, wherein the cycle refers to when the second gas (SG) is additionally supplied to the gas mixing system (3). In embodiments, the discharge gas (DG) evacuated from the gas mixing system (3) is set to a predetermined process variable that is ideally at a constant, or near constant flow rate and/or pressure.

In Step 1, the first gas (FG) is supplied to the gas mixing system (3) to achieve a predetermined process variable of the first gas (FG). In embodiments, the process variable of the first gas (FG) is about the same or the same as the process variable of the discharge gas (DG), evacuated from the gas mixing system (3). In embodiments, Step 1, 2, and 3 are in place while the gas mixing system (3) is not in an automatic cycle to transfer both the second gas (SG) and the first gas (FG) (separately and/or together) to the gas mixing system (3). In embodiments, the second gas (SG) transferred to the gas mixing system (3) varies in flow and pressure so when the second gas (SG) is supplied to the gas mixing system (3), to achieve a predetermined discharge gas (DG) process variable from the gas mixing system (3), the process variable of the first gas (FG) is temporarily reduced or halted.

Step 4, Inquiry 2: asks whether the gas mixing system (3) is in an automatic cycle, and if it is not, then the second control valve (VS) shall be closed to not permit the second gas (SG) from entering the gas mixing system (3). If Step 4 Inquiry is affirmative, and the gas mixing system (3) is in fact in an automatic cycle, then Step 5 is to commence.

Step 5: includes measuring the process variable of the second gas (SG); Step 6, Inquiry 3: asks is the process variable of the second gas more or less than a pre-determined process variable? If more, then close the second control valve (VS); If less, go to Step 7: and open the second control valve (VS), then go back to Step 5 to measure the process variable of the second gas.

It is to be noted that not all options and eventualities of operating the gas mixing system (3) are disclosed herein. For example, measuring the discharge gas (DG) evacuated from the gas mixing system (3) can be used instead of measuring the process variable of the first gas (FG) and/or the second gas (SG) to achieve the same or a similar result.

FIG. 24

Figure 24:
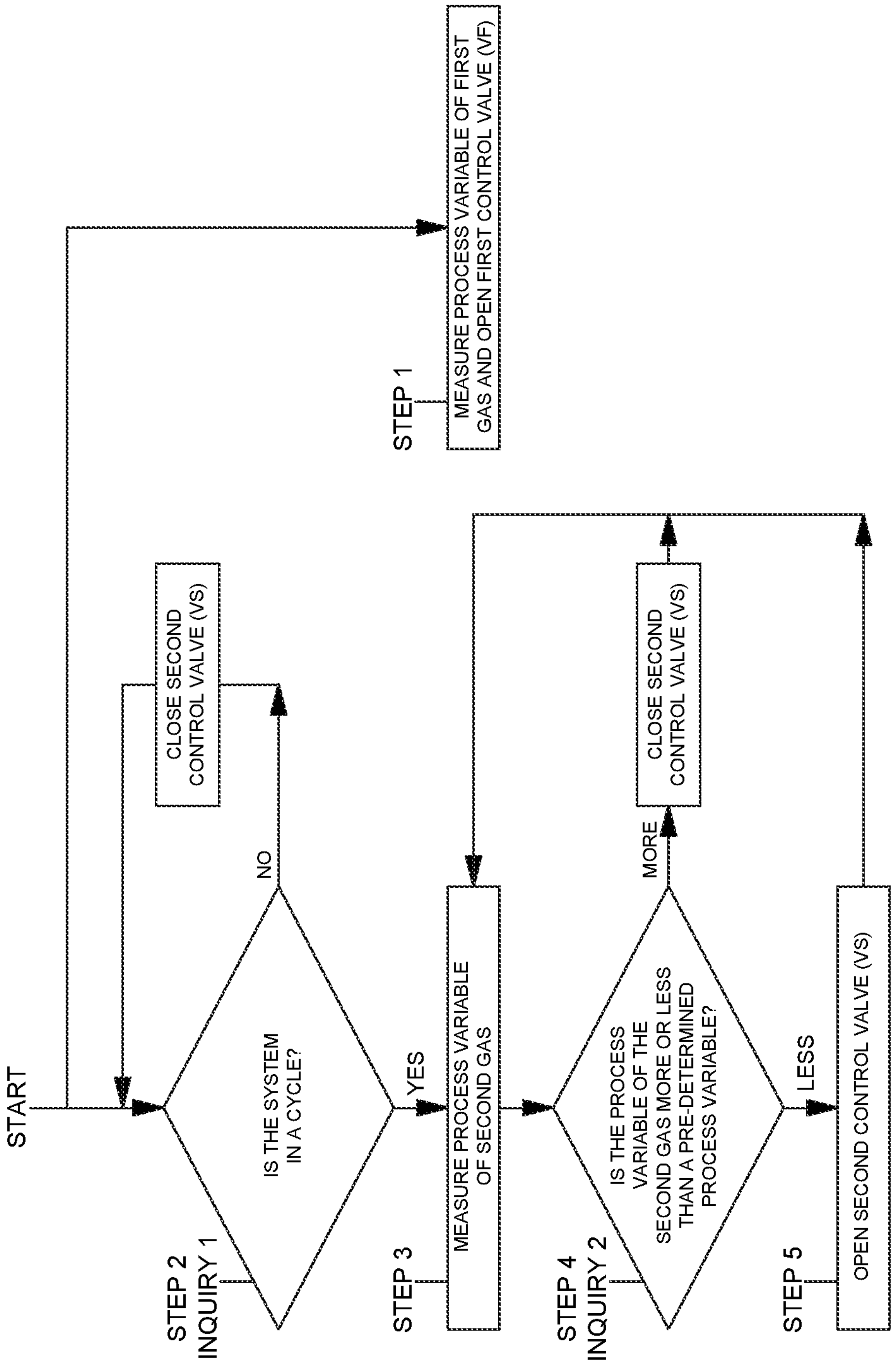
FIG. 24 shows a non-limiting embodiment of a gas mixing method.

FIG. 24 shows a non-limiting embodiment of a gas mixing method. Step 1: includes measuring the process variable of the first gas and opening the first control valve (VF) to permit the first gas to flow through the gas mixing system (3). In embodiments, the process variable includes a temperature, pressure, flowrate, density, pH, viscosity, or chemical composition. In Step 1, the first gas (FG) passes through the gas mixing system (3).

Step 4, Inquiry 1: asks whether the gas mixing system (3) is in an automatic cycle, and if it is not, then the second control valve (VS) shall be closed to not permit the second gas (SG) from entering the gas mixing system (3). If Step 4 Inquiry is affirmative, and the gas mixing system (3) is in fact in an automatic cycle, then Step 3 is to commence.

Step 3: includes measuring the process variable of the second gas (SG); Step 4, Inquiry 2: asks is the process variable of the second gas more or less than a pre-determined process variable? If more, then close the second control valve (VS); If less, go to Step 5: and open the second control valve (VS), then go back to Step 3 to measure the process variable of the second gas.

It is to be noted that not all options and eventualities of operating the gas mixing system (3) are disclosed herein. For example, measuring the discharge gas (DG) evacuated from the gas mixing system (3) can be used instead of measuring the process variable of the first gas (FG) and/or the second gas (SG) to achieve the same or a similar result.

It will be appreciated that the foregoing examples, given for purposes of illustration, are not to be construed as limiting the scope of this disclosure. Although only a few exemplary embodiments of this disclosure have been described in detail above, those skilled in the art will readily appreciate that many variation of the theme are possible in the exemplary embodiments without materially departing from the novel teachings and advantages of this disclosure. Accordingly, all such modifications are intended to be included within the scope of this disclosure that is defined in the following claims and all equivalents thereto. Further, it is recognized that many embodiments may be conceived in the design of a given system that do not achieve all of the advantages of some embodiments, yet the absence of a particular advantage shall not be construed to necessarily mean that such an embodiment is outside the scope of the present disclosure.

Thus, specific systems and methods of an automated fluidized bed level and density measurement system have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Although the foregoing text sets forth a detailed description of numerous different embodiments of the disclosure, it should be understood that the scope of the disclosure is defined by the words of the claims set forth at the end of this patent. The detailed description is to be construed as exemplary only and does not describe every possible embodiment of the disclosure because describing every possible embodiment would be impractical, if not impossible. Numerous alternative embodiments could be implemented, using either current technology or technology developed after the filing date of this patent, which would still fall within the scope of the claims defining the disclosure.

Thus, many modifications and variations may be made in the techniques and structures described and illustrated herein without departing from the spirit and scope of the present disclosure. Accordingly, it should be understood that the methods and apparatus described herein are illustrative only and are not limiting upon the scope of the disclosure.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the disclosure and does not pose a limitation on the scope of the disclosure otherwise claimed. No language in the specification should be construed as indicating any non-claimed element essential to the practice of the disclosure.

Groupings of alternative elements or embodiments of the disclosure disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

What is claimed is:

1. A method of mixing gases, the method comprises:

providing a gas mixing system, said gas mixing system comprising: a first gas inlet configured to accept a first gas having a first pressure and a first flow rate; a second gas inlet configured to accept a second gas having a second pressure and a second flow rate; and a discharge gas outlet configured to evacuate a discharge gas from said gas mixing system; and operating said gas mixing system in a plurality of modes of operation to produce said discharge gas, comprising:

in a first mode of operation, wherein said first flow rate of said first gas is greater than said second flow rate of said second gas, and wherein said first pressure of said first gas is greater than said second pressure of said second gas, said first gas entraining said second gas in said mixing system to mix said first gas with said second gas to produce said discharge gas comprising a mixture of said first gas and said second gas; and in a second mode of operation, wherein said second flow rate of said second gas is greater than said first flow rate of said first gas, and said first flow rate of said first gas in said second mode of operation is lesser than said first flow rate of said first gas in said first mode of operation; and said second pressure of said second gas is greater in said second mode of operation relative to said second pressure of said second gas in said first mode of operation;

wherein said method comprises one or more selected from the group consisting of:

at least a portion of said first gas is derived from a source of biogas;

at least a portion of said second gas is derived from said source of biogas;

at least a portion of said discharge gas is used to produce at least a portion of said first gas;

at least a portion of said discharge gas is used to produce at least a portion of said second gas; and at least a portion of said discharge gas is used to produce a biogas-related product, said biogas-related product includes one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, diesel, and power.

2. The method according to claim 1, wherein:

in said second mode of operation, said flow rate of said first gas comprises no flow.

3. The method according to claim 1, wherein:

in said second mode of operation, said discharge gas comprises a pressure lesser than or equal to said second pressure of said second gas in said second mode of operation.

4. The method according to claim 1, wherein:

in said first mode of operation, said first gas entrains said second gas by using a momentum of said first gas; and after said first gas is supplied to said first gas inlet of said gas mixing system, said gas mixing system creates a high-velocity jet of said first gas as said first gas passes through said gas mixing system, and said momentum of said high-velocity jet of said first gas entrains said second gas within said first gas within said gas mixing system to produce said discharge gas comprising said mixture of said first gas and said second gas.

5. The method according to claim 4, wherein:

said gas mixing system comprises one or more gas mixing systems selected from the group consisting of a compressor, a jet compressor, an ejector, an eductor, venturi jet pump, eductor-jet pump, and a thermocompressor.

6. The method according to claim 1, wherein:

in said first mode of operation, said discharge gas comprises a third pressure greater than said second pressure of said second gas and lesser than said first pressure of said first gas.

7. The method according to claim 1, further comprising:

supplying said second gas to said second inlet by a batch process, and supplying said first gas to said first inlet by a continuous process; and/or supplying said second gas to said second inlet from a vessel including a material undergoing a desorption step, and in said first mode of operation, said first gas entraining said second gas assists in said desorption of said material in said desorption step; and/or supplying said second gas to said second inlet from a vessel, and in said first mode of operation, said first gas entraining said second gas assists in evacuating said second gas from said vessel to a predetermined pressure within said vessel.

8. The method according to claim 1, further comprising:

providing a first control valve to regulate said flow rate of said first gas supplied to said first gas inlet of said gas mixing system; and providing a second control valve to regulate said flow rate of said second gas supplied to said second gas inlet of said gas mixing system;

in said first mode of operation, opening both said first control valve and said second control valve; and in said second mode of operation, closing said first control valve.

9. The method according to claim 1, further comprising:

providing a first control valve to regulate said flow rate of said first gas supplied to said first gas inlet of said gas mixing system; and providing a second control valve to regulate said flow rate of said second gas supplied to said second gas inlet of said gas mixing system;

in said first mode of operation, opening both said first control valve and said second control valve; and in said second mode of operation, opening said first control valve to a lesser amount relative to said first mode of operation.

10. The method according to claim 1, further comprising:

providing a first control valve to regulate said flow rate of said first gas supplied to said first gas inlet of said gas mixing system;

providing a second control valve to regulate said flow rate of said second gas supplied to said second gas inlet of said gas mixing system; and in said first mode of operation and in said second mode of operation, modulating said first control valve and/or said second control valve to maintain a predetermined third flow of said discharge gas.

11. The method according to claim 10, wherein:

in said first mode of operation and in said second mode of operation, the predetermined third flow of said discharge gas is identical.

12. The method according to claim 10, wherein:

in said first mode of operation and in said second mode of operation, said predetermined third flow of said discharge gas are not identical.

13. The method according to claim 1, further comprising:

providing a first control valve to regulate said flow rate of said first gas supplied to said first gas inlet of said gas mixing system;

providing a second control valve to regulate said flow rate of said second gas supplied to said second gas inlet of said gas mixing system;

setting said first control valve to open and setting said second control valve to closed.

14. A method to produce a processed biogas, the method comprises:

providing a gas processing system, said gas processing system being configured to accept a source of gas that includes and/or is derived from a source of biogas; and said gas processing system is configured to process said source of gas to produce a first gas, a second gas, and said processed biogas; and providing said gas mixing system, said gas mixing system comprising a first gas inlet configured to accept said first gas having a first pressure and a first flow rate; a second gas inlet configured to accept said second gas having a second pressure and a second flow rate; and a discharge gas outlet configured to evacuate a discharge gas from said gas mixing system, wherein said gas mixing system is configured to accept said first gas and said second gas from said gas processing system to produce said discharge gas, wherein said discharge gas is supplied to said gas processing system to produce at least a portion of said first gas, said second gas, and said processed biogas; and supplying said source of gas to said gas processing system;

processing said source of gas within said gas processing system to produce said first gas, said second gas, and said processed biogas;

supplying said first gas and said second gas from said gas processing system to said gas mixing system to produce said discharge gas; and supplying said discharge gas to said gas processing system to produce at least a portion of one or more gases selected from the group consisting of said first gas, said second gas, and said processed biogas.

15. The method according to claim 14, wherein:

said gas processing system comprises one or more processing systems selected from the group consisting of a water removal process, pre-pressurization with at least one blower, a hydrogen sulfide removal process, biogas chilling, biogas pressurization, a volatile organic compound removal process, a carbon dioxide removal process, a catalytic oxygen reduction process, an oxygen removal process, a pressure-swing adsorption process, a nitrogen removal process, a temperature swing adsorption process, a membrane separation process, a membrane carbon dioxide removal process, a metal removal process, a mercury removal process, a cryogenic gas separation process, a water-wash gas separation process, a pressure-swing adsorption process, a temperature swing adsorption water removal process, a cryogenic distillation process, a distillation process, a hydrogen production process, a partial oxidation process, an autothermal reforming process, a chemical production process, a combustion process, an ethanol production process, an alcohol production process, a liquid fuel production process, a Fischer Tropsch synthesis process, a steam methane reforming process, a catalytic process, an ammonia production process, a fuel cell, and a bioreactor including microorganisms.

16. The method according to claim 14, wherein:

said gas processing system comprises a pressurization process;

said first gas is evacuated from said gas processing system before said pressurization process and said second gas is evacuated from said gas processing system after said pressurization process; and said discharge gas is supplied to said gas processing system before said pressurization process.

17. The method according to claim 14, wherein:

said gas mixing system comprises one or more gas mixing systems selected from the group consisting of a compressor, a jet compressor, an ejector, an eductor, venturi jet pump, eductor-jet pump, and a thermocompressor.

18. The method according to claim 14, wherein:

said source of biogas is produced in one or more sources selected from the group consisting of an anerobic digester, a landfill, and a waste water treatment facility; and/or said method further comprises producing a biogas-related product from at least a portion of said processed biogas, said biogas-related product includes one or more products selected from the group consisting of renewable natural gas, a chemical, dimethyl ether, ethanol, Fischer-Tropsch product, hydrogen, methanol, mixed alcohols, an alcohol, 1-butanol, 2-butanol, jet fuel, gasoline, a liquid fuel, diesel, and power.

19. The method according to claim 14, wherein:

at least a portion of said second gas supplied from said gas processing system to said gas mixing system is used to regenerate an adsorbent within said gas processing system; and/or supplying said discharge gas to said gas processing system is at a pre-determined flow rate.

20. The method according to claim 1, wherein:

said gas mixing system comprises one or more gas mixing systems selected from the group consisting of a compressor, a jet compressor, an ejector, an eductor, venturi jet pump, eductor-jet pump, and a thermocompressor.

* * * * *